(12) United States Patent
Best

(10) Patent No.: US 7,726,967 B2
(45) Date of Patent: Jun. 1, 2010

(54) RADIANT BURNER

(75) Inventor: Willie H. Best, Columbia, SC (US)

(73) Assignee: Char-Broil, LLC, Columbus, GA (US)

( * ) Notice: Subject to any disclaimer, the term of this patent is extended or adjusted under 35 U.S.C. 154(b) by 1049 days.

(21) Appl. No.: 11/156,790

(22) Filed: Jun. 20, 2005

(65) Prior Publication Data

US 2006/0003279 A1  Jan. 5, 2006

Related U.S. Application Data

(60) Provisional application No. 60/582,276, filed on Jun. 23, 2004, provisional application No. 60/591,215, filed on Jul. 26, 2004.

(51) Int. Cl.
F23D 14/12 (2006.01)
(52) U.S. Cl. .......................... 431/328; 431/326; 431/7
(58) Field of Classification Search ................ 431/326, 431/328, 7; 126/92 R, 92 AC
See application file for complete search history.

(56) References Cited

U.S. PATENT DOCUMENTS

| | | | |
|---|---|---|---|
| 3,155,814 A | 11/1964 | Appleman et al. | |
| 3,245,458 A | 4/1966 | Patrick et al. | |
| 3,277,948 A | 10/1966 | Best | |
| 3,437,415 A | 4/1969 | Davis et al. | |
| 3,561,902 A | 2/1971 | Best | |
| 3,586,825 A | 6/1971 | Hurley | |
| 3,663,798 A | 5/1972 | Speidel et al. | |
| 3,683,058 A * | 8/1972 | Partiot et al. | 264/156 |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |
| 4,207,456 A | 6/1980 | Best | |
| 4,235,023 A | 11/1980 | Best | |
| 4,276,869 A | 7/1981 | Kern | |
| 4,321,857 A | 3/1982 | Best | |
| 4,375,802 A | 3/1983 | Wallasvaara | |
| 4,403,541 A | 9/1983 | Berger | |
| 4,403,597 A | 9/1983 | Miller | |
| 4,426,792 A | 1/1984 | Best | |

(Continued)

FOREIGN PATENT DOCUMENTS

DE  102 15 688 A1  11/2003

(Continued)

OTHER PUBLICATIONS

U.S. Appl. No. 11/156,410, filed Jun. 20, 2005; In re: Willie H. Best., entitled *Infrared Emitting Apparatus*.

(Continued)

*Primary Examiner*—Alfred Basichas
(74) *Attorney, Agent, or Firm*—Womble Carlyle Sandridge & Rice, PLLC

(57) ABSTRACT

A gas-fired burner unit for providing combustion and infrared radiation includes at least one plenum for receiving at least the gas, and at least one perforated metal plate mounted for receiving at least the gas from the plenum and supplying at least the gas to the combustion so that the combustion is proximate the perforated metal plate.

66 Claims, 20 Drawing Sheets

U.S. PATENT DOCUMENTS

| | | | |
|---|---|---|---|
| 4,437,833 A | 3/1984 | Mertz | |
| 4,508,097 A | 4/1985 | Berg | |
| 4,546,553 A | 10/1985 | Best | |
| 4,569,657 A * | 2/1986 | Laspeyres | 431/326 |
| 4,575,616 A | 3/1986 | Bergendal | |
| 4,606,261 A | 8/1986 | Bernardi | |
| 4,715,356 A | 12/1987 | Reynolds | |
| 4,785,552 A | 11/1988 | Best | |
| 4,798,192 A | 1/1989 | Maruko | |
| 4,839,502 A | 6/1989 | Swanson et al. | |
| 4,883,423 A | 11/1989 | Holowczenko | |
| 4,886,044 A | 12/1989 | Best | |
| 4,909,137 A | 3/1990 | Brugnoli | |
| 5,024,209 A | 6/1991 | Schaupert | |
| 5,028,760 A | 7/1991 | Okuyama | |
| 5,062,408 A | 11/1991 | Smith et al. | |
| 5,062,788 A | 11/1991 | Best | |
| 5,111,803 A | 5/1992 | Barker et al. | |
| 5,218,952 A | 6/1993 | Neufeldt | |
| 5,230,161 A | 7/1993 | Best | |
| 5,240,411 A | 8/1993 | Abalos | |
| 5,277,106 A | 1/1994 | Raymer et al. | |
| 5,279,277 A | 1/1994 | Barker | |
| 5,306,138 A | 4/1994 | Best | |
| 5,313,877 A | 5/1994 | Holland | |
| 5,363,567 A | 11/1994 | Best | |
| 5,488,897 A | 2/1996 | Snyder | |
| 5,509,403 A | 4/1996 | Kahlke et al. | |
| 5,513,623 A | 5/1996 | Hong | |
| 5,566,607 A | 10/1996 | Schleimer | |
| 5,567,459 A | 10/1996 | Conzalez-Hernandez et al. | |
| 5,571,009 A * | 11/1996 | Stalhane et al. | 431/328 |
| 5,582,094 A | 12/1996 | Peterson et al. | |
| 5,594,999 A | 1/1997 | Best | |
| 5,676,043 A | 10/1997 | Best | |
| 5,711,661 A | 1/1998 | Kushch et al. | |
| 5,761,990 A | 6/1998 | Stewart et al. | |
| 5,782,166 A | 7/1998 | Lin | |
| 5,823,099 A | 10/1998 | Ko | |
| 5,879,154 A | 3/1999 | Suchovsky | |
| 5,890,422 A | 4/1999 | Clark et al. | |
| 5,989,013 A | 11/1999 | Gray | |
| 6,114,666 A * | 9/2000 | Best | 219/411 |
| 6,159,001 A | 12/2000 | Kushch et al. | |
| 6,190,162 B1 | 2/2001 | Smith et al. | |
| 6,205,996 B1 | 3/2001 | Ryan | |
| 6,461,150 B1 | 10/2002 | Sirand | |
| 6,779,519 B2 | 8/2004 | Harneit | |
| 7,202,447 B2 | 4/2007 | Klingdon et al. | |
| 2001/0036610 A1 | 11/2001 | Wood | |
| 2002/0020405 A1 | 2/2002 | Coleman et al. | |
| 2004/0060552 A1 | 4/2004 | Yamada et al. | |
| 2004/0152028 A1* | 8/2004 | Singh et al. | 431/328 |
| 2004/0250688 A1 | 12/2004 | Farkas et al. | |
| 2006/0021517 A1 | 2/2006 | Best | |
| 2008/0072890 A1 | 3/2008 | Best | |
| 2008/0121117 A1 | 5/2008 | Best | |
| 2009/0165774 A1 | 7/2009 | Johnston et al. | |

FOREIGN PATENT DOCUMENTS

| | | |
|---|---|---|
| EP | 0 221 686 A1 | 5/1987 |
| EP | 1 028 292 | 8/2000 |
| EP | 1 096 203 A1 | 5/2001 |
| FR | 1 129 123 | 1/1957 |
| FR | 1 204 968 | 1/1960 |
| FR | 1 387 132 | 1/1965 |
| FR | 2 076 610 | 10/1971 |
| FR | 2 472 141 | 6/1981 |
| GB | 23552 | 3/1915 |
| GB | 432 481 | 7/1935 |
| GB | 562 136 | 6/1944 |
| GB | 576 377 | 4/1946 |
| GB | 1 029 774 | 5/1966 |
| GB | 1 339 345 | 12/1973 |
| WO | WO 2004/103133 | 12/2004 |
| WO | WO 2008/125258 | 10/2008 |

OTHER PUBLICATIONS

Cross Section of G3000 Cabinet Unit; Sep. 4, 2001; Thermal Engineering Corp., Columbia, South Carolina.

Cross Section of G-Series Burner System; Sep. 4, 2001; Thermal Engineering Corp., Columbia, South Carolina.

"Application of far infra-red radiation to cooking of meat products", Sheridan P., et al., Journal of Food Engineering (1999), vol. 41, pp. 203-208.

"Analysis of yield while cooking beefburger patties using far infrared radiation", Sheridan P., et al., Journal of Food Engineering (2002), vol. 51, No. 1, pp. 3-11.

"Modeling of heat transfer and evaporative mass losses during the cooking of beef patties using far-infrared radiation", Shilton N., Journal of Food Engineering (2002), vol. 55, No. 3, pp. 217-222 (Abstract Only).

"Determination of the thermal diffusivity of ground beef patties under infrared radiation oven-shelf cooking", Shilton, N., Journal of Food Engineering (Mar. 2002), vol. 52, No. 1, pp. 39-45 (Abstract Only).

"Impact of IR broiling on the thiamin and riboflavin retention and sensory quality of salmon steaks for foodservice use", Takahashi, Y., Journal of Food Engineering (1987), vol. 52, No. 1, pp. 4-6 (Abstract Only).

"Application of far infra-red radiation to cooking of meat products", Sheridan P., Journal of Food Engineering (1999), vol. 41, No. 3/4, pp. 203-208 (Abstract Only).

Office Action dated May 4, 2009 for Canadian Patent Application No. 2,571,395; In re: Willie H. Best, entitled Radiant Burner.

Char-Broil, Assembly Instructions for Models 6320, 6321 & 6323, 1992, pp. 1-18.

\* cited by examiner

RADIANT BURNER

CROSS-REFERENCE TO RELATED APPLICATIONS

The present application claims the benefit of both U.S. Provisional Application No. 60/582,276, filed Jun. 23, 2004, and U.S. Provisional Application No. 60/591,215, filed Jul. 26, 2004. Each of the above-referenced provisional applications is incorporated herein by reference, in its entirety. Also incorporated herein by reference, in its entirety, is the U.S. utility patent application that is entitled "Infrared Emitting Element", names Willie H. Best as the inventor, and has been filed on the same day as the present application.

TECHNICAL FIELD

The present invention relates to gas-fed infrared burners and, more particularly, to partitions used in gas-fed infrared burners.

BACKGROUND OF THE INVENTION

There are several types of gas-fired infrared burners being used in various manufactured products. These burners usually incorporate one of three design features. The most used and successful burner design employs a ceramic plate that contains apertures to allow the flow of the gas-air mixture to the surface for combustion. Also some types of porous ceramic can be used. The ceramic plate is usually about 0.500 inches thick and possesses relatively low thermal conductivity. The plate can also be manufactured from ceramic fibers such as a product sold under the Fibre Fax brand name. U.S. Pat. Nos. 3,277,948 and 3,561,902 to Best describe such a burner. The fuel input to these type burners is usually limited to about 350 BTUH/in$^2$ of emitting element surface.

The emitting surface of gas-fired radiant burners can also be produced from metal. These types of emitting surfaces have usually been metal form or metal screens. The metal screens are woven from metal strands. Experience with using these types of burners indicates that they have limited life due to failure of the screen. Failure of the screen allows the flame to retrogress into the burner plenum resulting in flashback. Stress developed during the weaving process probably contributes to these failures. Also, since the screen provides for quenching of the flame on its surface, the size of apertures needs to be relatively small. Therefore, the diameter of the wire from which the screen is woven is limited. The small diameter of the wire limits the strength and resistance to thermal fatigue. When these types of burners operate on a generally continuous basis, frequent replacement of failed burners is required.

The other method by which gas-fired radiant burners operate is for the flame and hot combustion gases from a conventional port type burner to be impinged on a surface (usually ceramic) capable of emitting infrared radiant energy. This concept of generating infrared radiant energy is not as efficient as the surface combustion type of infrared burners. There are also other methods of generating infrared radiant energy by which the energy is not directly produced by the burner. U.S. Pat. Nos. 4,546,553, 4,785,552, 5,230,161 and 6,114,666 to Best describe this technology. This type of design technology can also be used to convert short wavelengths to longer ones as described in U.S. Pat. No. 6,114,666 to Best.

There are some limitations associated with each type of gas-fired radiant burner presently in use. The burner that uses ceramic as an emitter surface is the type most widely used in industrial and commercial applications. However, because the emitter surface is made from ceramic, these types of burners are fragile compared to metal. Also, the ceramic emitter is subject to failure if it is used in applications where it can become wet, such as in outdoor gas grills as described in U.S. Pat. No. 4,321,857 to Best. However, this type of burner has been successfully used in outdoor grills when the grill is designed to protect the burner from rain.

The ceramic type of infrared radiant burner is used in many successful products such as disclosed in U.S. Pat. Nos. 4,321,857 and 5,676,043 to Best, and in many applications it will continue to be the burner of choice. There are other applications where its limitations prevent its use. As an example, the burner will fail (flashback) if it is fired at an input greater than about 350 BTUH/in$^2$. A typical burner with a ceramic radiation-emitting surface is disclosed in U.S. Pat. No. 3,277,948 to Best. Also, when these types of burners are over fired, incomplete combustion can occur.

Burners that use an emitting surface that employs a woven screen have not been reliable and usually have limited life in most applications of continuous use or where the burner is exposed to thermal shock through cycles of heating and cooling. Both the metal screen burner and ceramic type burners can fail when the input of fuel is increased beyond the ability of the surface to quench the flame, which results in retrogression of the flame into the burner plenum. Foam type of metal emitting surfaces can minimize some of the problems described, but they introduce new problems. Because of the porous nature of the material, it acts as a filter. Over time the surface will become clogged with atmospheric contaminates and the flow area through the surface is decreased resulting in variations in the combustion intensity over the surface. Also this type of material is expensive compared to other types of emitting surfaces. One type of this kind of porous metal is sold under the trade name of Metpore.

Another limitation of existing infrared burners is that when the primary air for combustion is supplied through a venturi as opposed to a pre-mixture of fuel and air supplied through a combustion air blower and mixer, secondary air for combustion is usually required. This phenomenon is notably true if the firing rate exceeds about 350 BTUH/in$^2$ of burner emitting surface. Typical infrared radiant burners of this type are described in U.S. Pat. Nos. 3,277,948 and 3,561,902 to Best. When the input of fuel to infrared burners (described by U.S. Pat. Nos. 3,277,948 and 3,561,902) is limited to under about 350 BTUH/in$^2$ of emitting surface, they can operate with 100% primary air with the use of a venturi. However, it is highly desirable in many applications to increase the energy input per unit area of emitting element surface and to distribute the energy systematically over the combustion surface of the burner. This is not practical to do with prior art type burners described above. Also, when an emitting element of a radiant type burner is placed close (within one inch) to an absorbing body, the emitting element temperature increases, thus increasing the tendency of prior art type burners to flashback. In many of the prior art type burners, secondary air for combustion is required. Some design restrictions are imposed in many applications when secondary air for combustion is required to ensure complete combustion. Also, secondary air for complete combustion is hard to control and usually results in excess air to the combustion process, which lowers the flame temperature and decreases combustion efficiency.

Another limitation of existing burner designs is that the emitting element is usually continuous. That is, the emitting surface area comprises most of the open side of the burner plenum. The emitting surface is usually surrounded by a border of about one half inch. In many applications of infrared type burners, it would be desirable to distribute the energy over larger surfaces than that of the emitting element itself. An example of such an application is the heating of the glass emitter described in U.S. Pat. No. 6,114,666 to Best. When it is possible to uniformly distribute the energy over the entire surface of the glass emitter, the burner can be placed very close to the underside of the glass eliminating the need to provide space for concentrated infrared energy to be dispersed over a larger area than its emitting area.

There are many other applications of the use of infrared radiant energy where it would be desirable to distribute the emitted energy over a larger area, such as in the curing of paint. There are other applications where it is desirable to concentrate more energy in a confined area than would be possible with existing technology where the combustion air is supplied through a venturi. Such an example would be to replace the conventional burner of a range top with a radiant type burner. It would provide many benefits if an infrared radiant type burner could have greater latitude in the amount of energy that is emitted over the surface of the burner—that is, for the firing rate to be dramatically increased or decreased per unit of area of the burner surface. Most of the prior art type infrared burners in use that use a venturi for the introduction of combustion air are limited to about 350 BTUH/in$^2$ of burner surface when operating at high fire and the more normal high fire rating of these types of burners is about 250 BTUH/in$^2$.

BRIEF SUMMARY OF SOME ASPECTS OF THE INVENTION

In accordance with one aspect of the present invention, a gas-fired burner unit for providing combustion and infrared radiation includes at least one plenum for receiving at least the gas, and at least one perforated metal plate mounted for receiving at least the gas from the plenum and supplying at least the gas to the combustion so that the combustion is proximate the perforated metal plate. Perforations of the perforated metal plate can have a width in a range of about 0.025 inches to about 0.062 inches.

One aspect of the present invention is the provision of an apparatus (e.g., a burner assembly or a baffle assembly) for at least partially defining a flow path in a gas-fired burner unit that generates combustion and infrared radiation. The apparatus can include at least one first metal plate having a plurality of holes that extend therethrough, and one or more second metal plates adjacent the first metal plate and having a multiplicity of holes that extend therethrough. Holes of the multiplicity of holes can have smaller widths than holes of the plurality of holes, and groups of holes of the multiplicity of holes can be respectively aligned with, and respectively in communication with, holes of the plurality of holes.

According to one aspect of the present invention, a gas-fired burner unit for providing combustion and infrared radiation includes at least one plenum, at least one venturi mounted for providing the gas and air to the plenum, and at least one burner assembly mounted for receiving the gas and the air from the plenum and providing the gas and air to the combustion. The burner assembly can be operative so that the combustion is proximate the burner assembly, and so that at least substantially all of the air required for completing the combustion is provided via the venturi while the burner unit's firing rate exceeds about 350 BTUH/in$^2$ of the burner unit's emitting surface.

In accordance with one aspect of the present invention, an apparatus for providing at least infrared radiant energy includes at least one emitter and at least one gas-fired burner unit. The gas-fired burner unit can be operative for nonuniformly heating the emitter so that the infrared radiant energy over the emitter is substantially equally distributed. For example, gas-fired burner unit can includes at least one burner assembly in opposing face-to-face configuration with respect to the emitter, with the burner assembly including a multiplicity of holes for providing at least the gas to combustion that occurs in a gap between the burner assembly and the emitter, and the multiplicity of holes can be arranged in a predetermined manner so that there is a lesser concentration of the holes proximate the burner assembly's center than there is outwardly from the burner assembly's center.

In accordance with one aspect of the present invention, a gas-fired burner unit for providing combustion and infrared radiation includes at least one plenum for receiving at least the gas, and perforated members (e.g., plates) mounted in series for at least partially obstructing an opening of the plenum and at least partially defining a flow path for providing at least the gas from the plenum to the combustion. Each of the perforated members can be a nonwoven, metallic plate. The perforated members can include an upstream perforated member and a downstream perforated member that is positioned downstream from the upstream perforated member in the flow path (e.g., the upstream perforated member and the downstream perforated member are arranged in series in the flow path). Downstream ends of perforations of the downstream perforated member are for having the combustion proximate thereto, so that the downstream perforated member can become red-hot and emit at least some of the infrared radiation. Multiple at least substantially discrete chambers can be positioned between the upstream perforated member and the downstream perforated member. Upstream ends of perforations of the downstream perforated member can be respectively open to the chambers, and downstream ends of perforations of the upstream perforated member can be respectively open to the chambers.

The upstream perforated member can be replaced with multiple upstream perforated members that are arranged in parallel in the flow path, and likewise the downstream perforated member can be replaced with multiple downstream perforated members that are arranged in parallel in the flow path. The perforated members can be replaced with members having passages that are not in the form of perforations.

In accordance with one aspect of the present invention, there can be multiple mounting members (e.g., plates) that play a role in defining the chambers respectively between the perforated members. Each of the mounting members can have holes that extend therethrough, and the holes of the mounting members can be larger than the perforations of the perforated members. Each of the perforated members can be sandwiched between respective mounting members, with the perforations of the perforated member(s) being respectively aligned with, and in communication with, the holes of the mounting members. Advantageously, these sandwich-like articles can be very sturdy and durable.

Whereas only a single perforated member, or the like, can be used, it can be advantageous to use multiple of them arranged in series in the flow path, in an effort to advantageously restrict flashback and/or advantageously restrict the amount of heat that reaches the plenum. Restricting the heating of the gas-air mixture in the plenum can have significant advantages. For example, keeping the plenum's gas-air mixture cool can play a role in allowing at least substantially all of the oxygen needed for combustion to be provided via a venturi and the plenum. Using thin perforated members can also play a role in allowing at least substantially all of the oxygen needed for combustion to be provided via the venturi and the plenum. When at least substantially all of the oxygen needed for combustion is provided via the plenum, the introduction of excess air to the combustion can be controlled (e.g., substantially eliminated), which can advantageously result in optimal heating of one or more infrared radiant energy emitters that are adjacent the burner unit. The infrared radiant energy emitter can be the element that functions to ultimately emit the radiant energy that is used for heating items such as, but not limited to, food.

As mentioned above, the downstream perforated member(s) emit infrared radiation. In addition, when the downstream perforated member(s) are sandwiched between the mounting members, the downstream-most one of these mounting members can also emit infrared radiation. The infrared radiation emitted form the downstream mounting member can advantageously be at relatively longer wavelengths. This can be advantageous because it is generally desirable to increase the radiant energy output at the longer wavelengths because they are more readily absorbed than short wave lengths by most materials (e.g., food being cooked).

Other aspects and advantages of the present invention will become apparent from the following.

BRIEF DESCRIPTION OF THE DRAWINGS

Having described some aspect of the invention in general terms, reference will now be made to the accompanying drawings, which are not necessarily drawn to scale, and wherein.

DETAILED DESCRIPTION OF EXEMPLARY EMBODIMENTS

Figure 1:
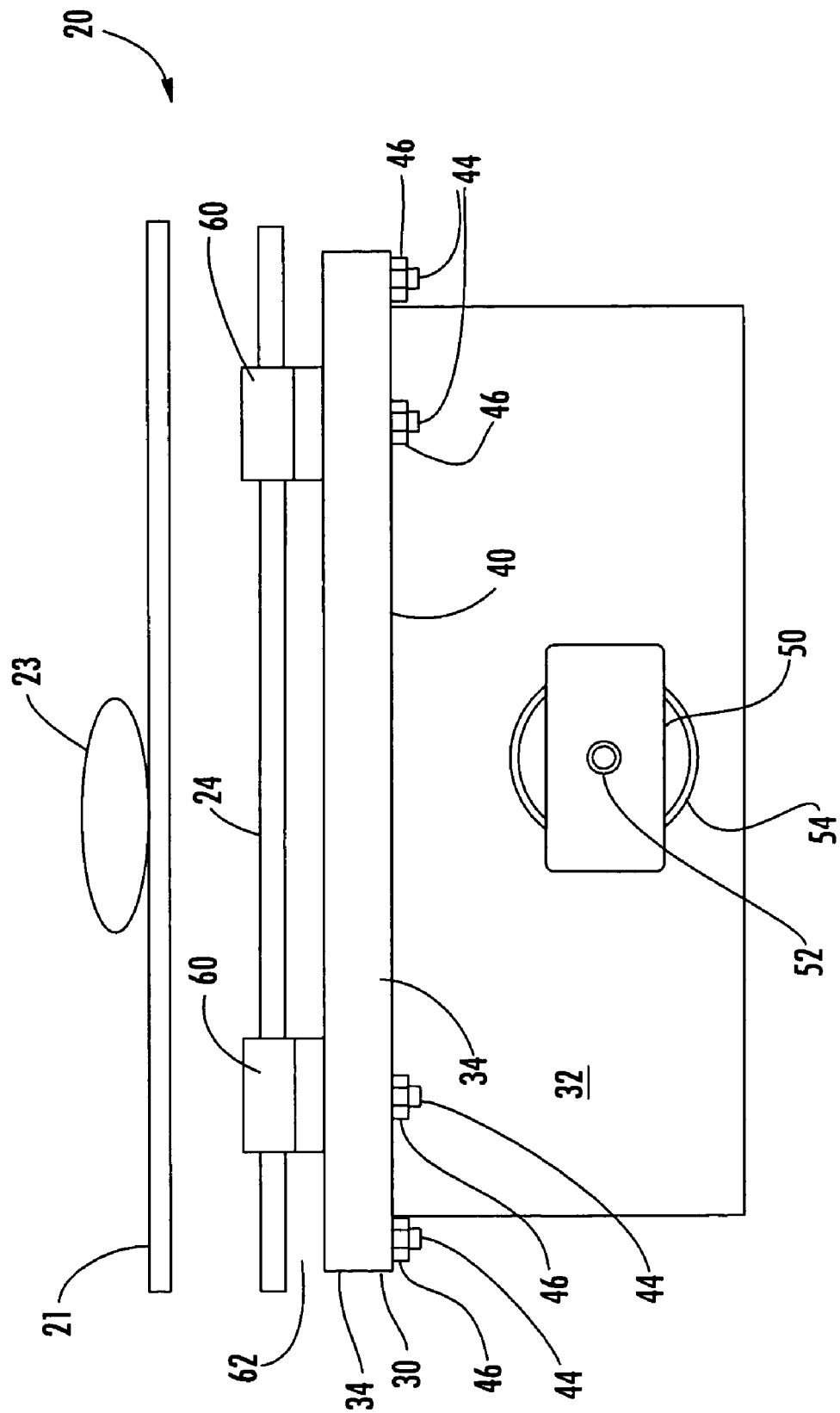
FIG. 1 is a schematic, end elevation view of a burner unit in a cooking apparatus, in accordance with an exemplary embodiment of the present invention.
Figure 2:
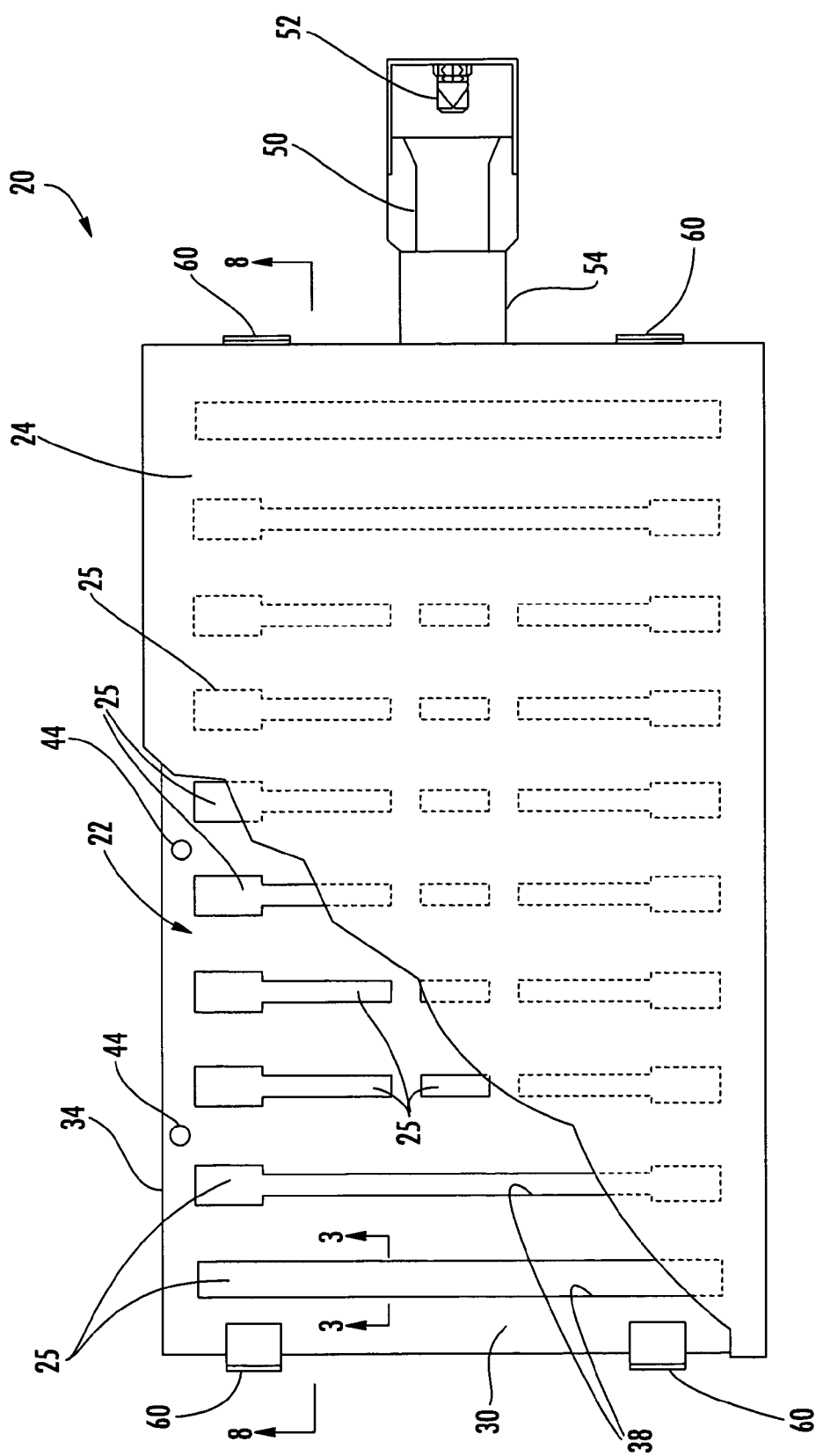
FIG. 2 is a schematic, top plan view of the burner unit of FIG. 1, with the emitter partially cut away.
Figure 3:
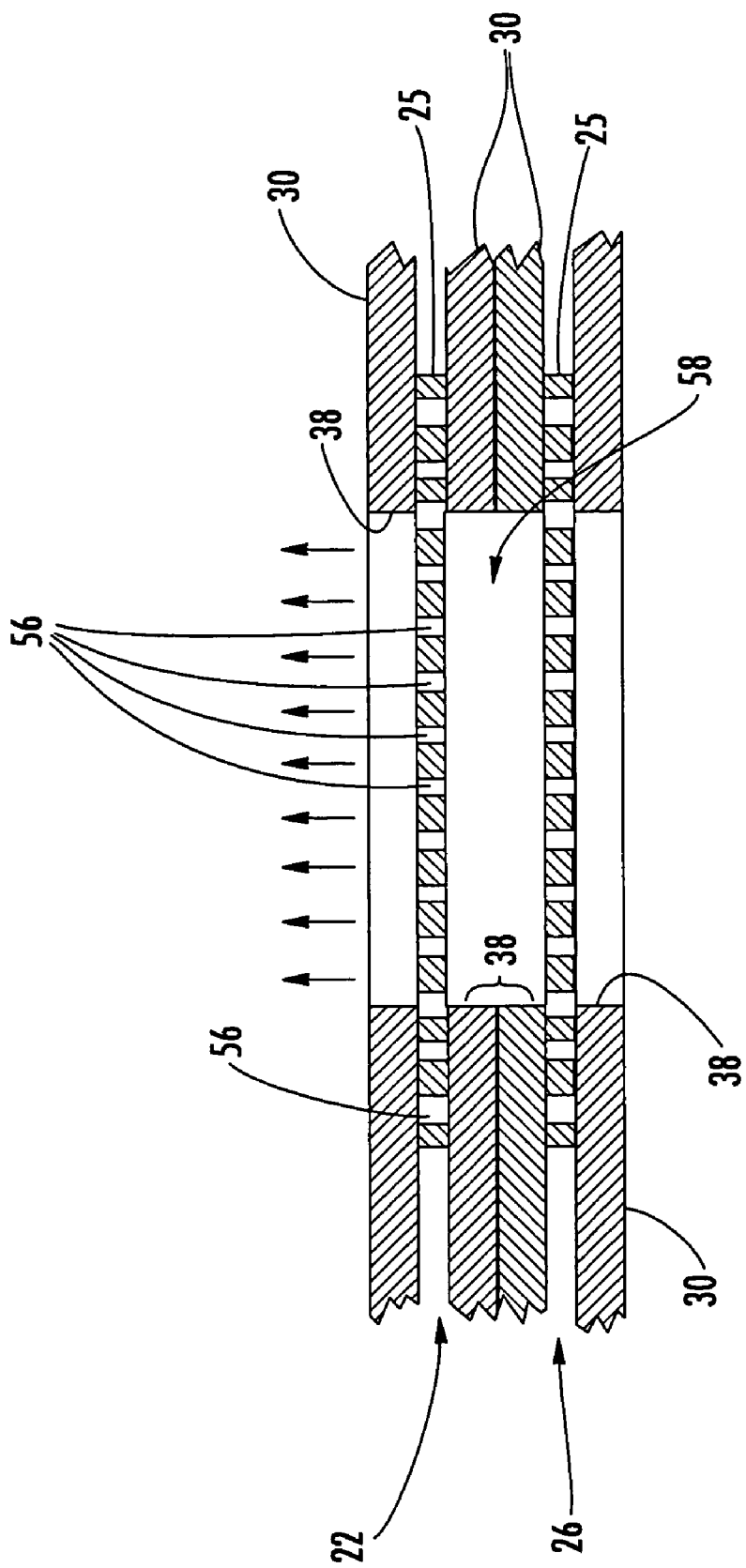
FIG. 3 is a schematic, cross-sectional, enlarged view of a portion of burner and baffle assemblies of the burner unit, taken along line 3-3 of FIG. 2.

Referring now in greater detail to the drawings, in which like numerals refer to like parts throughout the several views, FIGS. 1-8 illustrate features of an infrared radiant burner unit 20 for generating infrared radiant energy by burning a gaseous fuel, in accordance with an exemplary embodiment of the present invention. Very generally described, and as can be understood from FIGS. 1-3, the burner unit 20 operates by burning the gaseous fuel so that combustion, which is schematically represented as flames by the series of vertical arrows in FIG. 3, emanates from/is proximate an outer surface of a burner element (e.g., burner assembly 22) and is typically at least partially within a gap between the burner assembly and an infrared radiant energy emitter 24. The vertical arrows in FIG. 3 are schematic in nature because, for example, the flames of the combustion are typically in a bed-like arrangement that is in close proximity to the outer surface of the burner assembly 22 during normal operation.

The emitter 24 is the part of the burner unit 20 that functions to ultimately emit the radiant energy that is used for heating items such as, but not limited to, food. The emitter 24 is partially cut away in FIG. 2 so that part of the burner assembly 22, that would otherwise be hidden from view in FIG. 2, is shown. In addition, portions of the burner assembly 22 with holes extending therethrough (e.g., partition(s) with holes, or more specifically perforated members 25 that are parts of the burner assembly) that are hidden from view behind the emitter 24 are illustrated by broken lines. Only a representative few of the perforated members 25 are identified by their reference numerals in FIGS. 2 and 4 in an effort to clarify those views.

The burner unit 20 can be used in many different applications. As one example that is partially and schematically illustrated in FIG. 1, the burner unit 20 can be part of a cooking apparatus that includes a support 21 that is for supporting food 23 and is in sufficiently close proximity to the burner unit 20 so that infrared radiant energy emitted from the emitter 24 cooks the food. Alternatively, the emitter 24 can be omitted from the cooking apparatus and the food 23 can be cooked by infrared radiant energy emitted by the burner assembly 22 as well as by convection associated with the combustion ensuing from the burner assembly. The support 21 for supporting the food 23 can be any conventional mechanism for supporting food that is being cooked, such as a conventional open grating or a skewer-like device associated with a rotisserie. The cooking apparatus can further include an open-top housing (not shown) for containing the burner unit 20 and carrying the support 21. More specifically, the cooking apparatus that includes the burner unit 20 and support 21 can be an outdoor grill generally like that disclosed in U.S. Pat. No. 6,114,666, which is incorporated herein by reference, in its entirety. Indeed, the burner unit 20 includes features that can make it very well suited for an outdoor grill, as well as many other types of cooking apparatus.

In accordance with the exemplary embodiment of the present invention, the support 21 can be a cooking grid having bottom surfaces that are in contact with (e.g., rest upon) the upper surface of the infrared radiant energy emitter 24, or the cooking grid 26 can be positioned slightly above the upper surface of the emitter 24. Such arrangements can be optional, but when employed they can at least play a role in: overcoming problems associated with flare-up and/or provide substantially uniform energy distribution over the upper surfaces of the cooking grid. These features are further described in the U.S. utility patent application that is entitled "Infrared Emitting Element", names Willie H. Best as the inventor, has been filed on the same day as the present application, and is incorporated herein by reference, in its entirety.

Figure 4:
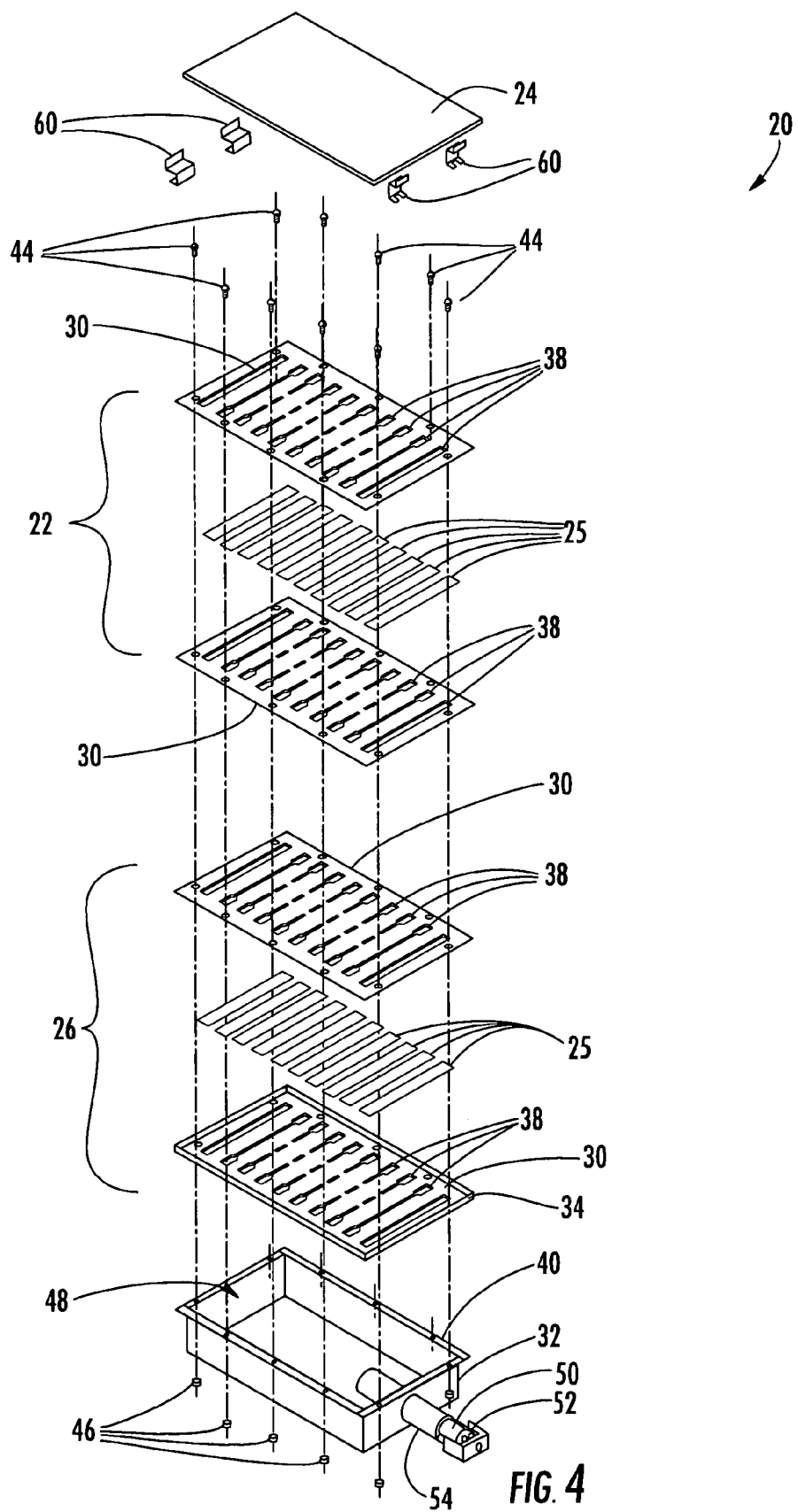
FIG. 4 is a schematic, exploded view of the burner unit of FIG. 1.

Referring in more detail to FIGS. 3 and 4, one or more baffle assemblies 26 can be positioned in series with the burner assembly 22 to enhance the operation of the burner unit 20, as will be discussed in greater detail below. Whereas there can be more than one baffle assembly 26 positioned in series with the burner assembly 22, only a single baffle assembly 26 is illustrated in series with the burner assembly 22 in the accompanying figures, and primarily only a single baffle assembly is described in the following for purposes of readability rather than for the purpose of narrowing the scope of the present invention.

In accordance with the exemplary embodiment of the present invention, each of the burner and baffle assemblies 22, 26 includes one or more perforated members 25 (e.g., partitions with holes) and one or more mounting members 30 for mounting the perforated members. Each of FIGS. 2 and 4 are schematic because, for example, the perforated members 25 are illustrated schematically therein. The perforated members 25 can be best seen in FIGS. 3 and 5, which are enlarged views that are discussed in greater detail below. As illustrated in FIG. 4, each of the burner and baffle assemblies 22, 26 includes multiple perforated members 25; however, for each of the burner and baffle assemblies, the multiple perforated members can be replaced with a single, broader perforated member (e.g., see perforated member 25j in FIG. 16, which is discussed below).

Very generally described, for each of the burner and baffle assemblies 22, 26, the perforated members 25 and mounting members 30 can, alone or in combination, be broadly characterized as partitions because, for example, they have the effect of at least partially defining the flow path of the gaseous fuel through the burner unit 20. Accordingly, and for purposes of explanation rather than for the purpose of narrowing the scope of the present invention, the arrangement of components of the burner unit 20 is at times referred to in the following with reference to the flow path of the gaseous fuel, namely by using the terms "upstream" and "downstream".

The one or more baffle assemblies 26 that are positioned in series with the burner assembly 22 are positioned upstream from the burner assembly. The burner and baffle assemblies 22, 26 are arranged so that there is a series of the perforated members 25 that are respectively spaced apart from one another along the flow path and are attached to the open side of a plenum 32 so that a seal is formed around the perimeter of the open side of the plenum.

In accordance with an alternative embodiment of the present invention, perforated members 25 are not arranged in series, so that there is only a single layer of perforated members 25. The single layer can be the result of, for example, omitting the baffle assembly 26. On the other hand, the embodiment that includes only the single layer of the perforated members 25 can also be described in the context of omitting the so-called burner assembly 22, and then referring to the so-called baffle assembly 26 as the burner assembly.

The burner assembly 22 and the baffle assembly 26 can be constructed similarly or identically, although varied constructions are also within the scope of the present invention. In accordance with the exemplary embodiment of the present invention, the perforated members of the burner and baffle assemblies 22, 26 are sufficiently alike so that all of the perforated members are identified by the reference numeral 25, and the mounting members of the burner and baffle assemblies 22, 26 are sufficiently alike so that all of the mounting members are identified by the reference numeral 30. Nonetheless, in accordance with the exemplary embodiment of the present invention, the upstream-most mounting member 30 is formed so as to include an upright flange 34 that extends around and upwardly from the entire periphery of the upstream-most mounting member 30; in contrast the other mounting members 30 do not include such a flange.

The upright flange 34 extends a sufficient distance from the upstream-most mounting member 30 such that the upright flange encircles, is in face-to-face relation with edges of the burner assembly 22, and extends past/upwardly from the burner assembly 22. As will become apparent from the following, the upright flange 34 can, for example, help to facilitate stacking and stabilization of components of the burner and baffle assemblies 22, 26 by restricting relative movement therebetween, and it can also help to restrict the introduction of secondary air to the combustion. The combustion is schematically represented by the series of vertical arrows in FIG. 3, and FIG. 3 is illustrative of partial, cross-sectional views taken across each of the perforated members 25. In accordance with an alternative embodiment of the present invention, the upright flange 34 is omitted from the upstream-most mounting member 30, or the upright flange 34 can be a component of another one of the mounting members 30, or the upright flange 34 can be a separate component that is mounted to, or otherwise proximate, the burner assembly 22 and/or baffle assembly 26.

Figure 6:
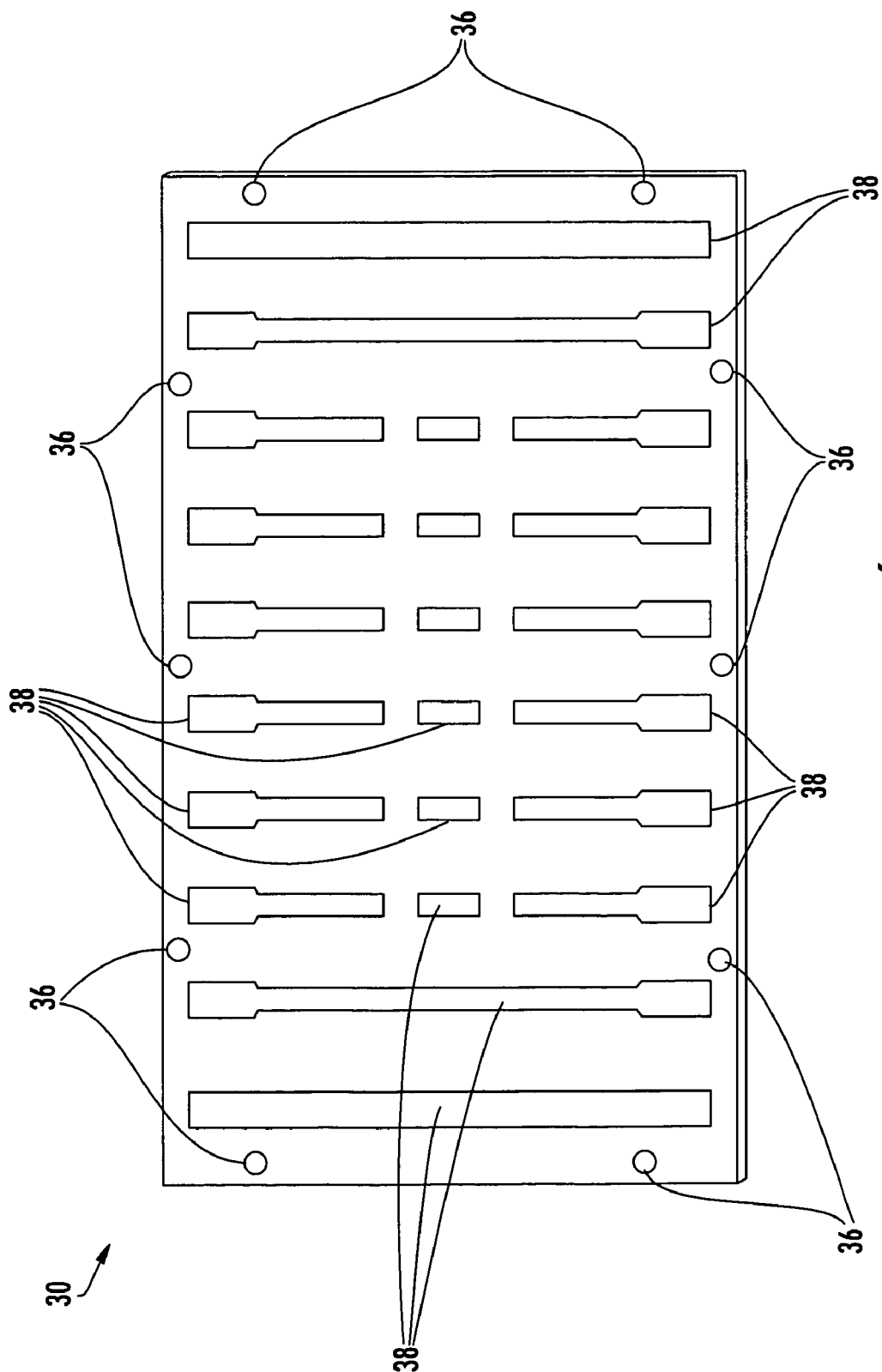
FIG. 6 is an isolated pictorial view of a representative mounting member of the burner unit of FIG. 1.

Each of the mounting members 30 can be characterized, for purposes of explanation rather than for purposes of narrowing the scope of the present invention, as a generally mask-like, nonwoven plate of sheet metal. Nonetheless, the mounting members 30 can be other mechanisms (e.g., mounting and/or spacing mechanisms) that can be used to mount and appropriately space the perforated members 25. FIG. 6 is a schematic, isolated pictorial view of a mounting member 30 that is representative of all of the mounting members of the burner and baffles assemblies 22, 26, except that the mounting member illustrated in FIG. 6 does not include the upright flange 34 that optionally extends around and upwardly from the entire periphery of the upstream-most mounting member 30. With continued reference to FIG. 6, the mounting member 30 includes multiple mounting holes 36 that extend through the marginal portion of the mounting member. Each of the mounting members 30 also defines other holes that extend completely therethrough, and these other holes can be referred to as mask holes 38 for purposes of explanation rather than for purposes of narrowing the scope of the present invention. The size and arrangement of the mask holes 38 defines a pattern of heat distribution over the downstream surface of the burner assembly 22. That is, the combustion (e.g., represented by the series of vertical arrows in FIG. 3) emanate from the downstream openings of the mask holes 38 of the downstream-most mounting member 30.

As illustrated in FIGS. 3 and 4, the mask holes 38 of the burner assembly 22 are respectively sized the same as, and aligned with, the mask holes of the baffle assembly 26. The mask holes 38 of the adjacent mounting members 30 of the burner assembly 22 are respectively aligned with one another, and these aligned mask holes respectively have the perforated members 25 of the burner assembly interposed therebetween. Similarly, the mask holes 38 of the adjacent mounting members 30 of the baffle assembly 26 are respectively aligned with one another, and these aligned mask holes respectively have the perforated members 25 of the baffle assembly interposed therebetween. Other arrangements are also within the scope of the present invention.

More specifically, the perforated members 25 can be laminated (sandwiched) between the respective mounting members 30. Even more specifically described, the burner assembly 22 of the exemplary embodiment of the present invention can be characterized as being the unit consisting primarily of, or substantially solely of, the downstream-most mounting member 30, the mounting member that is adjacent the downstream-most mounting member, and the perforated members 25 sandwiched between these two mounting members; and these two mounting members can be optionally connected together by welding, or more specifically spot welding, or the like. Similarly, the baffle assembly 26 of the exemplary embodiment of the present invention can be characterized as being the unit consisting primarily of, or substantially solely of, the upstream-most mounting member 30, the mounting member that is adjacent the upstream-most mounting member, and the perforated members 25 sandwiched between these two mounting members; and these two mounting members can be optionally connected together by welding, or more specifically spot welding, or the like. Alternatively, the spot welds can be omitted, and other means for mounting are also within the scope of the present invention.

In accordance with the exemplary embodiment of the present invention, marginal portions of the burner assembly 22 and the baffle assembly 26 are mounted to a peripheral flange 40 of the plenum 32 to form a gas-tight seal around the perimeter of the plenum. As best understood with reference to FIG. 7, the plenum's flange 40 includes mounting holes 42 for facilitating mounting of the burner assembly 22 and the baffle assembly 26. The burner assembly 22 and the baffle assembly 26 can be mounted to the peripheral flange 40 of the plenum 32 by respectively aligning the mounting holes 36 of the burner and baffle assemblies with the mounting holes 42 of the of the plenum's flange 40, then passing male fasteners 44 (e.g., bolts, or the like) through these holes and optionally respectively attaching female fasteners 46 (e.g., nuts, or the like) to the male fasteners. Other methods and apparatus for mounting or otherwise associating the burner assembly 22 and the baffle assembly 26 to the plenum 32 are also within the scope of the present invention. In addition, whereas the burner assembly 22 and the baffle assembly 26 are often referred to herein as different components for the purpose of clarifying this disclosure, they can also be referred to together/collectively as a burner assembly.

Figure 7:
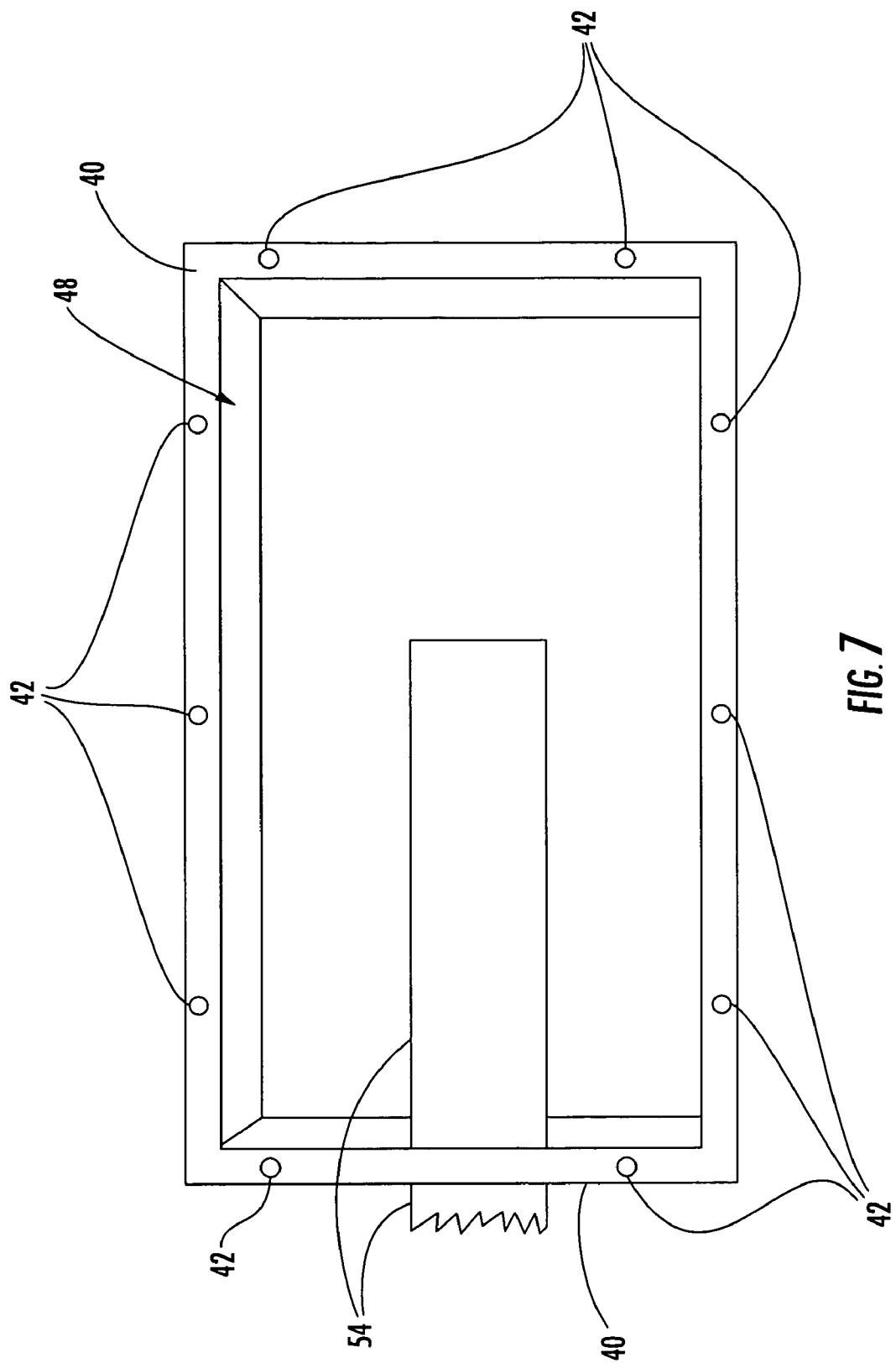
FIG. 7 is an isolated pictorial view of the plenum, and a portion of an associated passageway, of the burner unit of FIG. 1.

Referring to the housing/plenum 32 more specifically, and as best understood with reference to FIG. 7, the plenum 32 is formed with an outlet opening 48 that is partially closed as a result of the burner assembly 22 and the baffle assembly 26 being mounted to the plenum's flange 40. A gas-air mixture is supplied to the plenum 32 through a conventional venturi 50 (FIGS. 2 and 4). Alternatively, the gas-air mixture can be supplied by way of any other conventional means, or the like, such as by way of a connection for a pre-mixture of gas and air, such as a pre-mixture provided by a combustion air blower and mixer (not shown). When the venturi 50 is used, the gas is supplied through a conventional orifice 52 (FIGS. 2 and 4) to which a gas supply line is connected (not shown). From the venturi 50, the gas-air mixture flows through a feed pipe 54 that extends through a side wall of the plenum 32 and has an outlet end that is open in the interior of the plenum 32, so that the gas-air mixture flows into the interior of the plenum. A portion of the feed pipe 54, the venturi 50 and the orifice 52 are cut away in, and thereby not shown in, FIG. 7.

Figure 5:
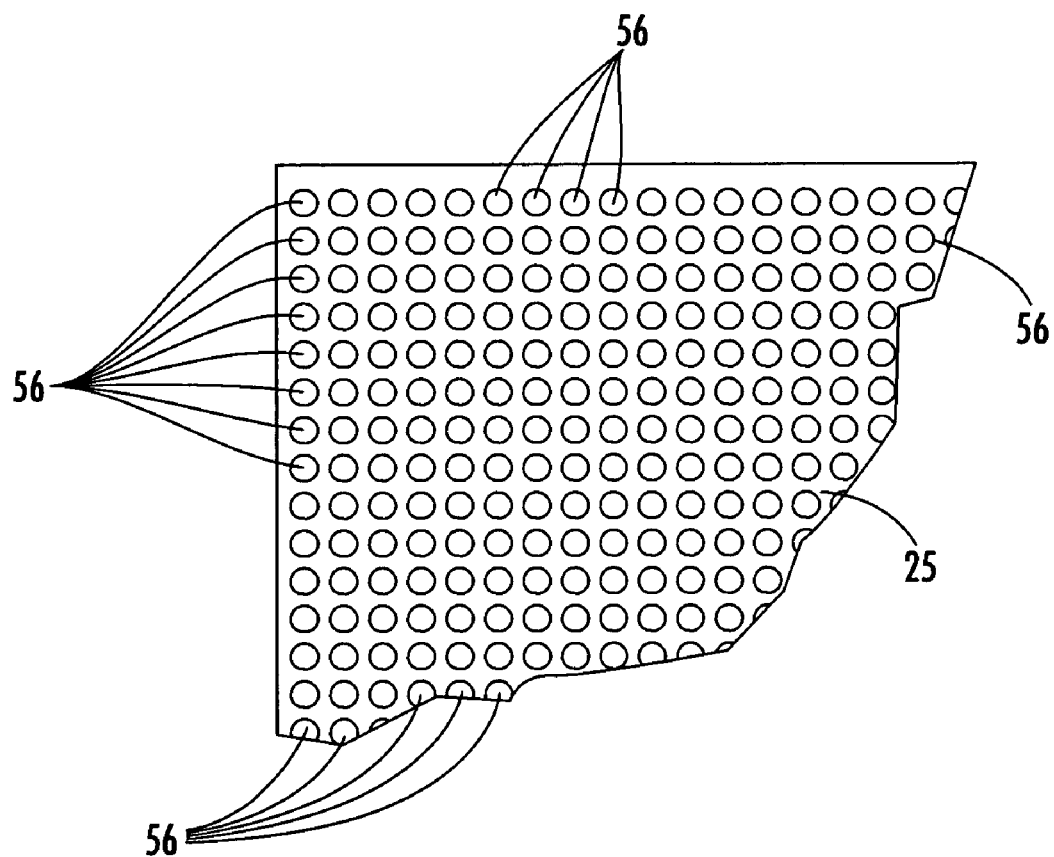
FIG. 5 is an enlarged plan view of a portion of a representative perforated member of the burner unit of FIG. 1.

Referring in greater detail to the perforated members 25 (e.g., partitions with holes), a portion of a representative perforated member is shown on an enlarged scale in FIG. 5, and a pair of serially arranged perforated members, and respective portions of the burner and baffle assemblies 22, 26, are shown on an enlarged scale in FIG. 3. In accordance with the exemplary embodiment of the present invention, each of the perforated members 25 is fabricated from a nonwoven plate of high temperature metal alloy so that it defines a multiplicity of holes or perforations 56 that extend completely therethrough. The combustion air mixture flows from the plenum 32, to and through the perforations 56 that are respectively open to the mask holes 38 of the mounting members 30, and the combustion is closely associated with the downstream openings of the perforations 56 of the burner assembly 22 (i.e., the perforations 56 that are open to the mask holes 38 of the burner assembly 22). In accordance with the exemplary embodiment of the present invention, the perforations 56 that are not open to the mask holes 38 of the mounting members 30 are closed by the mounting members, and the combustion air mixture does not flow through those perforations 56 that are respectively closed by the mounting members 30.

The perforations 56 in the perforated members 25 can be formed by perforating (e.g., boring or punching), but they can also be formed by means other than perforating, such that the perforated members 25 can be more generally referred to as partitions with holes, or the like. The perforated members 25 contiguous with the mask holes 38 in the burner assembly 22 are small enough to be capable of quenching the combustion/flame, which is schematically represented by the series of vertical arrows in FIG. 3, at the downstream surface of the burner assembly 22 so that flashback does not occur. In accordance with the exemplary embodiment, the diameter of each of the perforations 56 contained in the perforated members 25 does not exceed about 0.062 inches, and more specifically the diameter of each of the perforations 56 contained in the perforated members 25 is in a range of about 0.025 inches to about 0.062 inches. More precisely, the diameter of each of the perforations 56 contained in the perforated members 25 does not exceed 0.062 inches, and the diameter of each of the perforations 56 contained in the perforated members 25 can be in a range of 0.025 inches to 0.062 inches. More specifically, the diameter of each of the perforations 56 contained in the perforated members 25 can be in a range of about 0.030 inches, or about 0.033 inches, to about 0.060 inches. More precisely, the diameter of each of the perforations 56 contained in the perforated members 25 can be in a range of 0.030 inches, or 0.033 inches, to 0.060 inches. In one specific example, the diameter of each of the perforations 56 contained in the perforated members 25 is about 0.03125 inches. More precisely, the diameter of each of the perforations 56 contained in the perforated members 25 can be 0.03125 inches. Alternatively, the width of the perforations 56 contained in the perforated members 25 do not exceed about 0.045 inches if the perforations are rectangular. Perforations 56 of other shapes are also within the scope of the present invention. The above-described diameters can be more generally referred to as widths.

In addition, the perforated members 25 of the exemplary embodiment are relatively thin, such as by being less than about 0.125 inches thick, to minimize the pressure drop resulting from the combustion air mixture flowing through the perforations 56 of the perforated members 25. More precisely, the perforated members 25 can be less than 0.125 inches thick. More specifically, the thickness of the perforated members 25 can be within a range of about 0.0156 inches to about 0.0625 inches, and even more specifically the thickness of the perforated members 25 can be about 0.0312 inches. More precisely, the thickness of the perforated members 25 can be within a range of 0.0156 inches to 0.0625 inches, and even more specifically the thickness of the perforated members 25 can be 0.0312 inches.

More specifically, it can be advantageous in a perforated member 25 with a thickness of less than about 0.125 inches, such as a thickness of about 0.0312 inches, for the diameter of each perforation 56 to be about 0.033 inches, with the perforations 56 placed on about 0.055 inch straight centers (i.e., so that centers of adjacent perforations 56 are about 0.055 inches apart). More generally, the distance between centers of adjacent perforations 56 can be within a range of about 0.040 inches to about 0.080 inches. More precisely, the perforations 56 can be placed on 0.055 inch straight centers. Also, the distance between centers of adjacent perforations 56 can be within a range of 0.040 inches to 0.080 inches.

It is also advantageous for the flames of the combustion to remain in close contact with the downstream side of the perforated members 25 of the burner assembly 22 in order to transfer the maximum amount of the energy of combustion into the perforated members of the burner assembly, in order to maximize the radiant output from the burner assembly. With the combustion remaining in close contact with the downstream side of the perforated members 25 of the burner assembly 22, the flames of the combustion can be characterized as at least generally projecting from the downstream ends of the perforations of the perforated members 25 of the burner assembly 22.

If there is any tendency for the combustion/flames to lift and develop a boundary layer between the combustion/flames and the perforated members 25 of the burner assembly 22, the heat transfer from the combustion/flames to the burner assembly will be greatly diminished. Therefore and in accordance with the exemplary embodiment of the present invention, in order to maintain good combustion/flame stability and to avoid any lifting of the combustion/flame, the mixture velocity through the perforations 56 of the perforated members 25 is no more than about 80% of the flame speed which is 2.2 ft/sec for methane and 2.7 ft/sec for propane at ambient temperatures.

As best understood with reference to FIG. 3, each of the mounting members 30 and perforated members 25 can be substantially planar, so that the laminating or other mounting of them results in the formation of voids, spaces, or chambers 58. In addition, the perforated members 25 can be of sufficient width and length that marginal portions of the perforated members 25 extends beyond the mask holes 38 of the mounting members 30 to effectively form seals proximate the peripheries of the mask holes 38. Also, it is advantageous for the perforated members 25 to be flat so that the seals proximate the peripheries of the mask holes 38 can be readily formed. It would be more difficult to achieve such a gas-tight seal if the perforated members 25 were replaced with woven screens. Nonetheless, in accordance with alternative embodiments of the present invention the perforated members 25 can optionally be replaced with woven screens, sintered elements with passageways therethrough, ceramic elements with passageways therethrough, or the like.

As illustrated in FIG. 3, the perforated members 25 are arranged in series so that the gas-air mixture flows through at least two layers of the perforated members 25. This serial arrangement decreases the temperature of the gas-air mixture in the plenum 32 because the upstream perforated members 25 block infrared radiation from the underside of the downstream perforated members 25 that are included in the burner assembly 22, and the chambers 58 act as thermal barriers to convective heat transfer. The multiple layers of perforated members 25, through which the gas-air mixture must flow, also substantially eliminate any tendency for the burner unit 20 flashback, as mentioned above. A single perforated member 25 or a single layer of perforated members 25 that are coplanar can be used to quench the combustion/flame. On the other hand, it is advantageous to use the serial arrangement of the perforated members 25 because the operation of the burner unit 20 becomes more stable and dependable when two or more perforated members 25 are used in series.

While the primary source of infrared radiant energy is the downstream-most perforated members 25 (i.e., the one or more perforated members 25 of the burner assembly 22), the portions of downstream-most mounting member 30 that are between and around the downstream perforated members 25 also radiate radiant energy, but at a temperature lower than the temperature of the downstream-most perforated members 25. This feature advantageously increases the levels of emitted energy at the longer wavelengths. It is generally desirable to increase the radiant energy output at the longer wavelengths because they are more readily absorbed than short wave lengths by most materials. For example, and not for the purpose of limiting the scope of the present invention, it is noted that it has been demonstrated that when infrared radiant energy is used for grilling food (specifically meat) that there are beneficial results when most of the energy is emitted at wavelengths greater than 3 microns.

As mentioned above, in one alternative embodiment, the burner assembly 22 can be omitted, and then the so-called baffle assembly 26 can be referred to as the burner assembly. That alternative embodiment is just one example of the various possible arrangements that are within the scope of the present invention. For example, and as best understood with general reference to FIG. 4, in one version, the so-called burner assembly 22 is mounted beneath the so-called baffle assembly 26, such that the so-called baffle assembly 26 functions as (and can be referred to as) the burner assembly, and the so-called burner assembly 22 functions as (and can be referred to as) the baffle assembly. Also in accordance with this version, and as best understood with general reference to FIG. 3, one of the mounting members 30 can be omitted, so that in a cross-sectional view similar to that of FIG. 3, the two layers of perforated members 25 are separated by only a single mounting member 30.

In accordance with the exemplary embodiment of the present invention, the infrared radiant energy emitter 24 is held by mounting clips 60 that retain the emitter within about an inch or less of the downstream surface of the burner assembly 22, and so that a peripheral exhaust opening 62 is defined between the periphery of the burner assembly 22 and the emitter 24. Each mounting clip 60 includes a lower horizontal flange that is in opposing face-to-face engagement with the downstream surface of the burner assembly 22 and held thereto by a respective one of the male fasteners 44. Each mounting clip 60 also includes an upper horizontal flange that is in opposing face-to-face engagement with the bottom surface of the emitter 24. A tab extends upwardly from each upper horizontal flange of the clips 60 and engages the outer edge of the emitter 24. Alternatively, the emitter 24 can be mounted by other means or even be omitted.

The material used in the construction of the burner unit 20 is selected to be capable of withstanding the operating temperatures of the burner unit for long periods. For example, the perforated members 25 can be fabricated from a high temperature stainless steel, such as, but not limited to, 310 stainless steel, and the mounting members 30 and plenum 32 can be constructed from 304 stainless steel. More specifically, suitable perforated members 25 can obtained from Ferguson Perforating, which is located at 30-140 Ernest Street, Providence, R.I. 02905-0038. The emitter 24 can be made of metal or from another high temperature material. More specifically, the emitter 24 can be constructed from 310 stainless steel and/or nichrome, and the emitter can also be glass as described by U.S. Pat. No. 6,114,666 to Best. U.S. Pat. No. 6,114,666 is incorporated herein by reference, in its entirety. Other emitters 24 are within the scope of the present invention. For example, whereas the emitter 24 of the exemplary embodiment of the present invention is solid, it could alternatively be perforated, such as a perforated plate, or a screen. In any event, it is preferred, but not necessarily required, for the emissivity of the emitter 24 to be at least 0.7 or greater after it is oxidized, with this oxidizing being carried out before the burner unit 20 is assembled or from the operation of the burner unit 20. For a thorough discussion of emissivity, see NASA S-31 "Measurement of Thermal Radiation Properties of Solids" 1963 (585 pages) and "Thermal Radiation Properties Survey," G. G. Gubaneff, J. E. Janssen and R. H Torberg, J. E. Janssen and H. R. Torberg, Honeywell Research Center, Minneapolis, Minn., 1960. The above references are cited by CRC Handbook of Tables for Applied Engineering Science, page 163.

The emitter 24 is heated by infrared radiation from the burner assembly 22 and from the hot products of combustion (i.e., the hot products resulting from the combustion/flames that emanate from the downstream surface of the burner assembly 22 and are schematically represented by the series of vertical arrows in FIG. 3). When the emitter 24 is replaced with a woven screen or a perforated plate, the usable infrared radiation emitted from the burner unit 20 is emitted from both the burner assembly 22 and the woven screen or perforated plate. In contrast, when the solid emitter 24 is used, then substantially all of the usable infrared radiant energy emitted from the burner unit 20 is emitted or transmitted from the emitter 24.

In accordance with an alternative embodiment of the present invention, the emitter 24 is omitted. Tests have demonstrated that the radiant energy output of the burner unit 20 decreases by more than 25% when the emitter 24 is removed. This is the result of the emitter 24, when present as in the exemplary embodiment of the present invention, absorbing or transmitting the radiant energy from the burner assembly 22 and being heated from the products of combustion emerging from the burner assembly 22. Also, the temperature of the burner assembly 22 is increased when cooling of the surface of the burner assembly by free convection is eliminated by covering the burner assembly with the emitter 24 and limiting the size of the peripheral exhaust opening 62. In addition, the solid emitter 24 can protect the burner assembly 22 from moisture to help render the burner unit 20 water-resistant. This can be an important benefit in many applications where the burner unit 20 is used in a drying or curing process that takes place in a wet or damp atmosphere. Also, in some process applications, the outer emitter 24 will protect the burner assembly 22 from splatter or contamination from the process. An example or such a process would be the drying of coated paper. Even when the emitter 24 is replaced with a woven screen or a perforated plate, some protection of the burner assembly 22 is provided.

Figure 8:
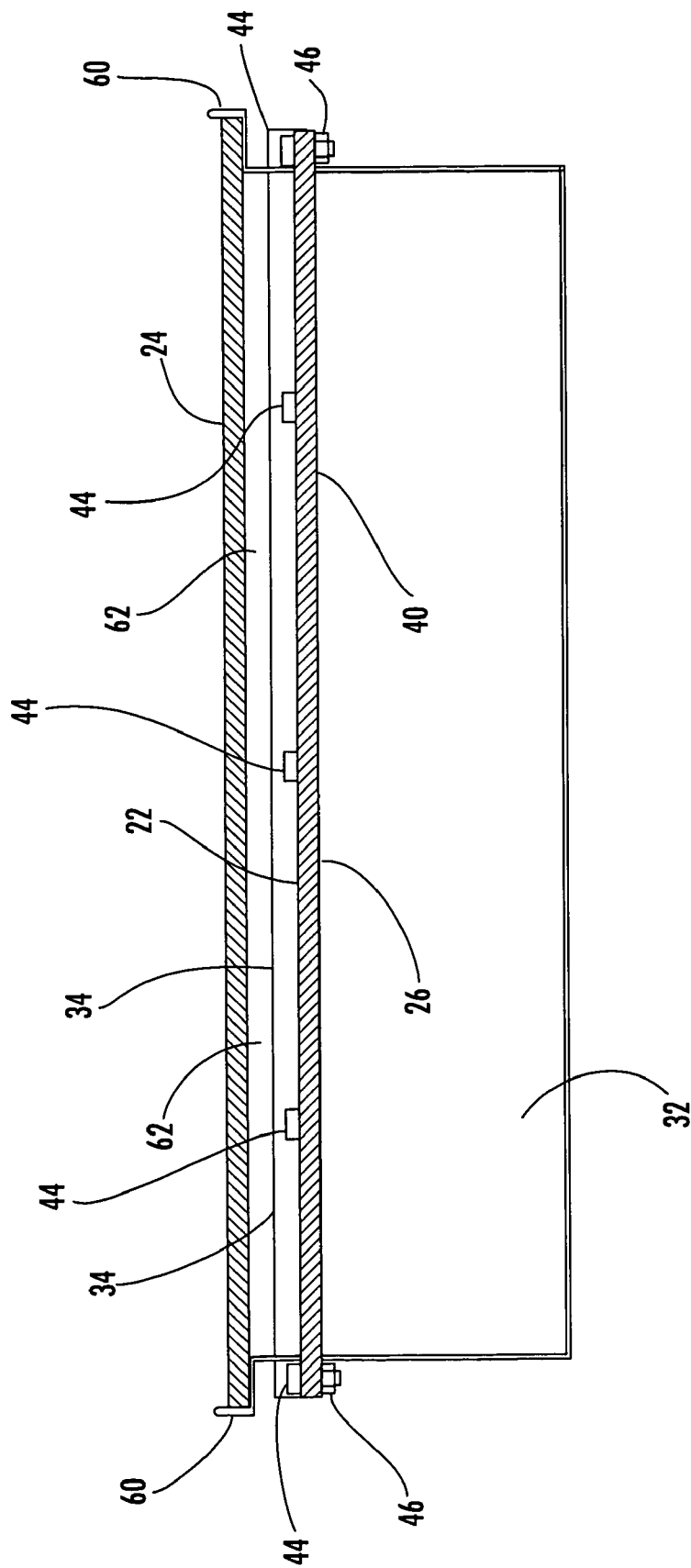
FIG. 8 is a schematic, cross-sectional view taken along line 8-8 of FIG. 2.
Figure 9:
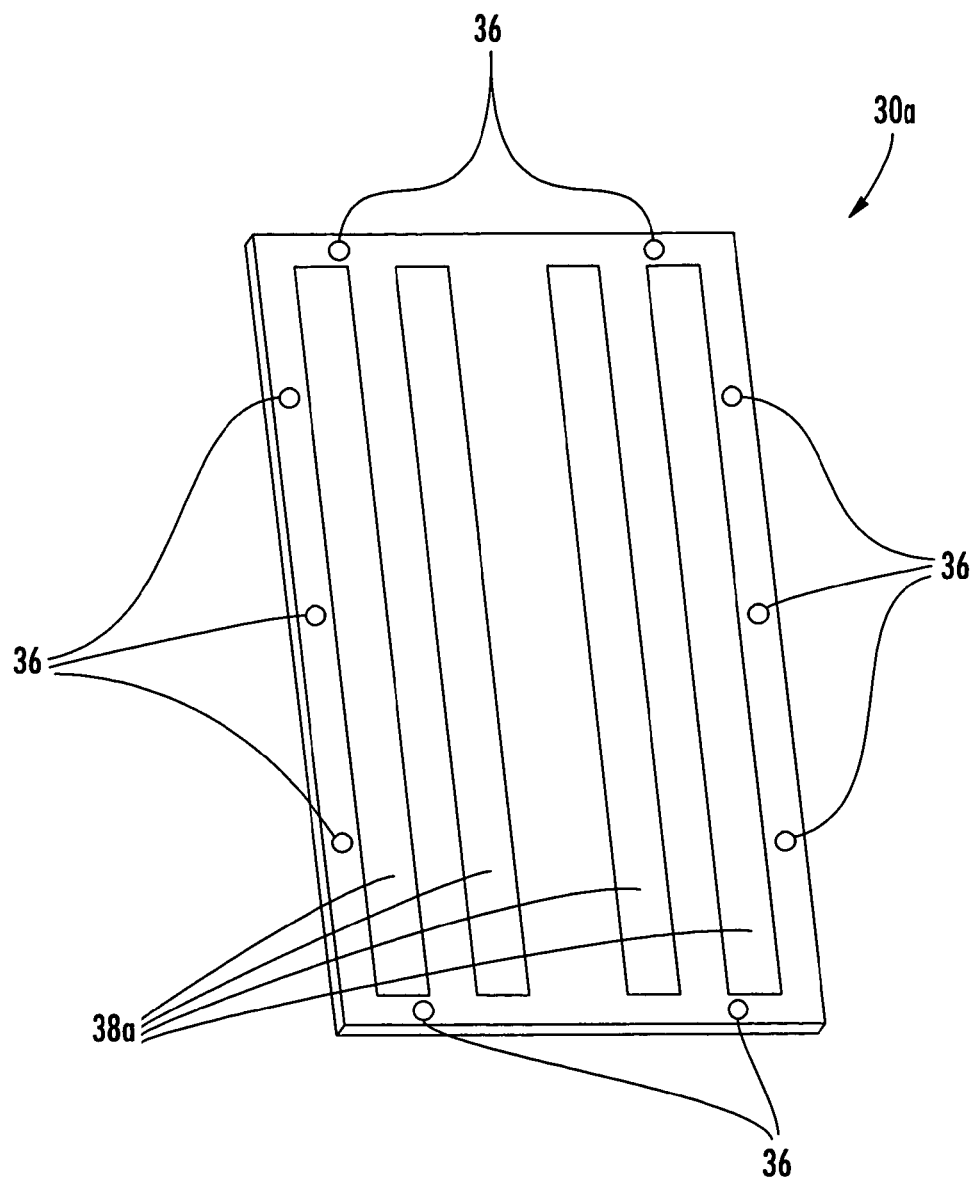
FIG. 9 is a schematic, pictorial view of a representative mounting member of a burner unit of another embodiment of the present invention.
Figure 10:
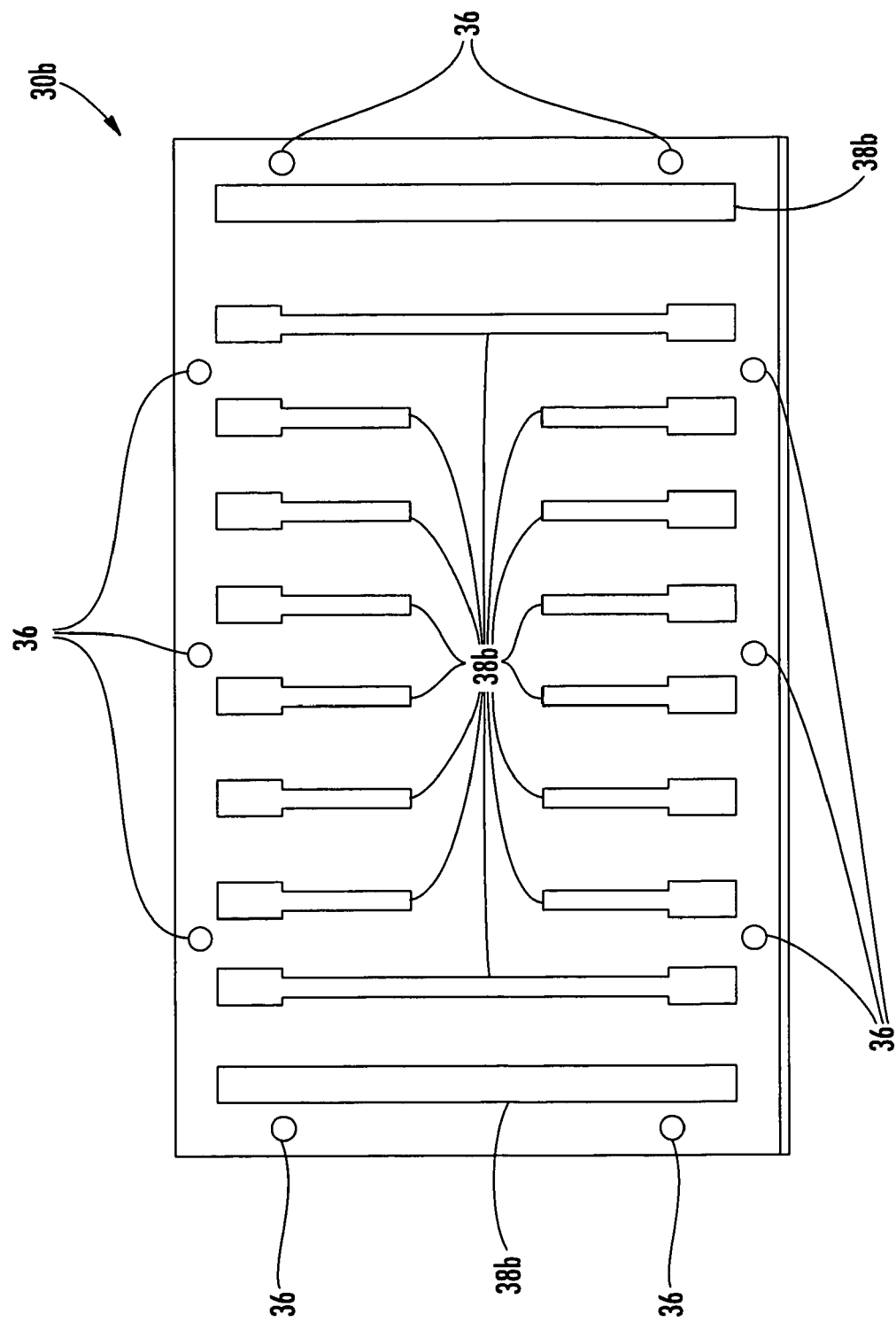
FIG. 10 is a schematic, pictorial view of a representative mounting member of a burner unit of another embodiment of the present invention.
Figure 11:
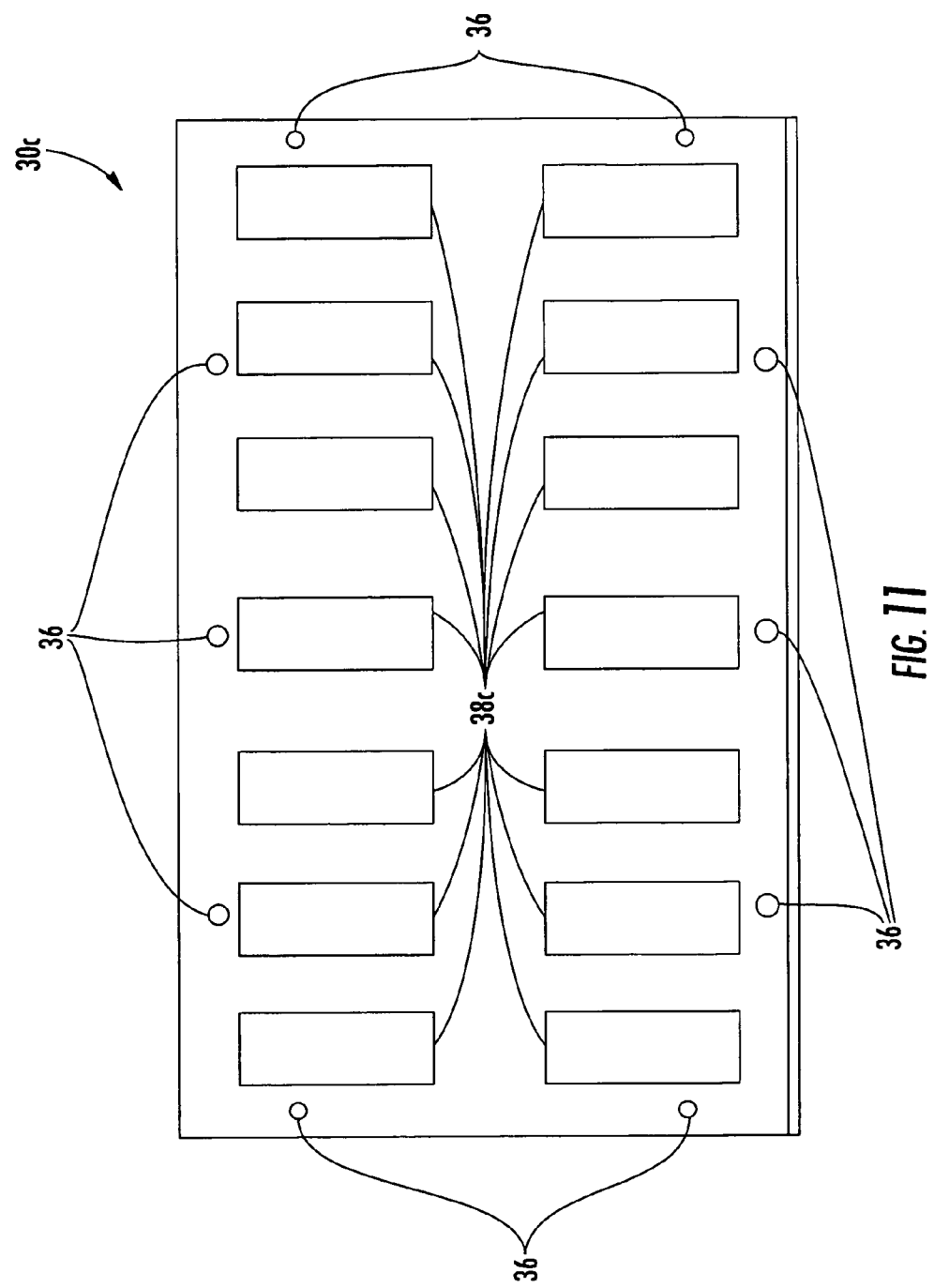
FIG. 11 is a schematic, pictorial view of a representative mounting member of a burner unit of another embodiment of the present invention.
Figure 12:
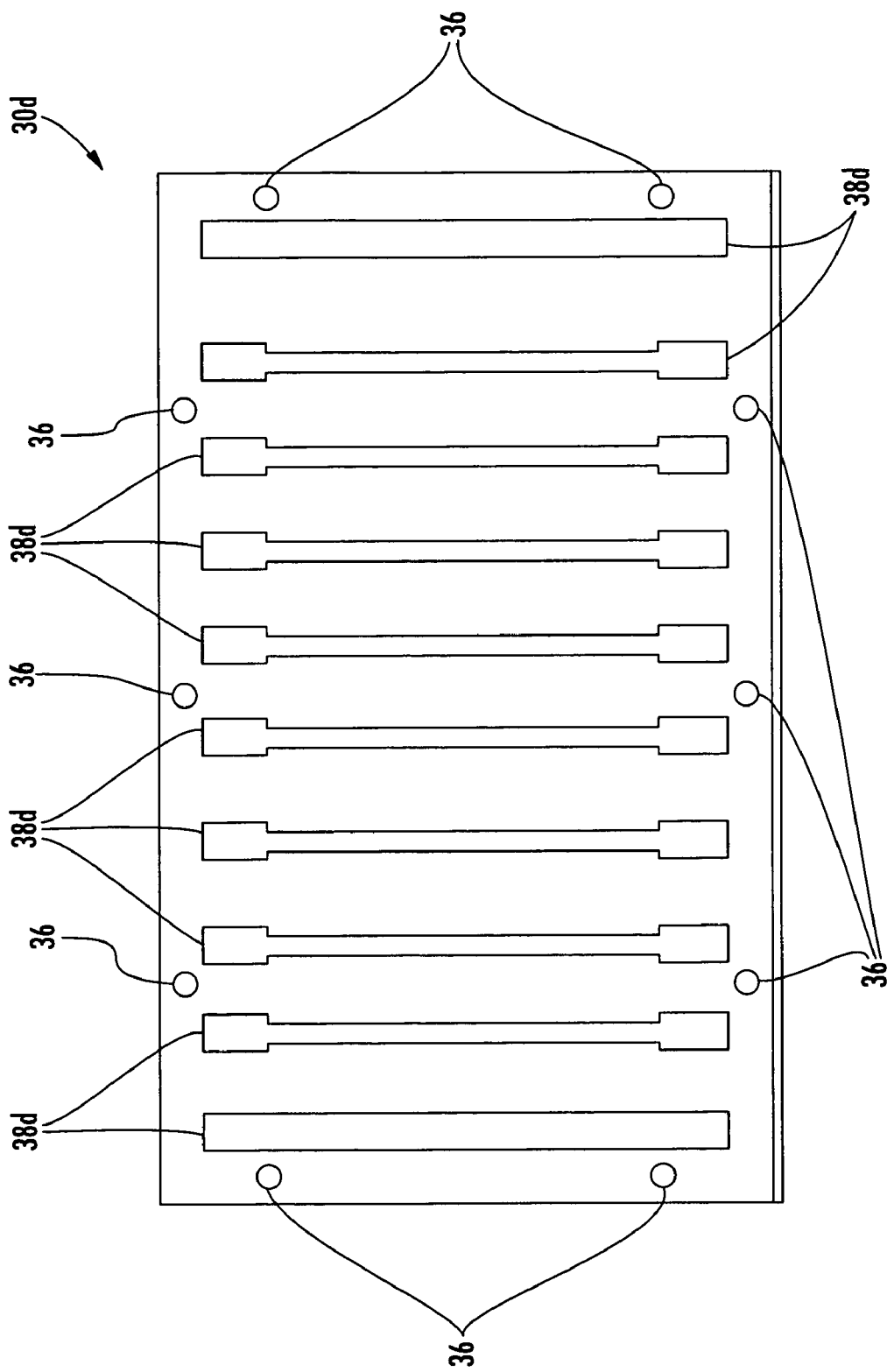
FIG. 12 is a schematic, pictorial view of a representative mounting member of a burner unit of another embodiment of the present invention.
Figure 13:
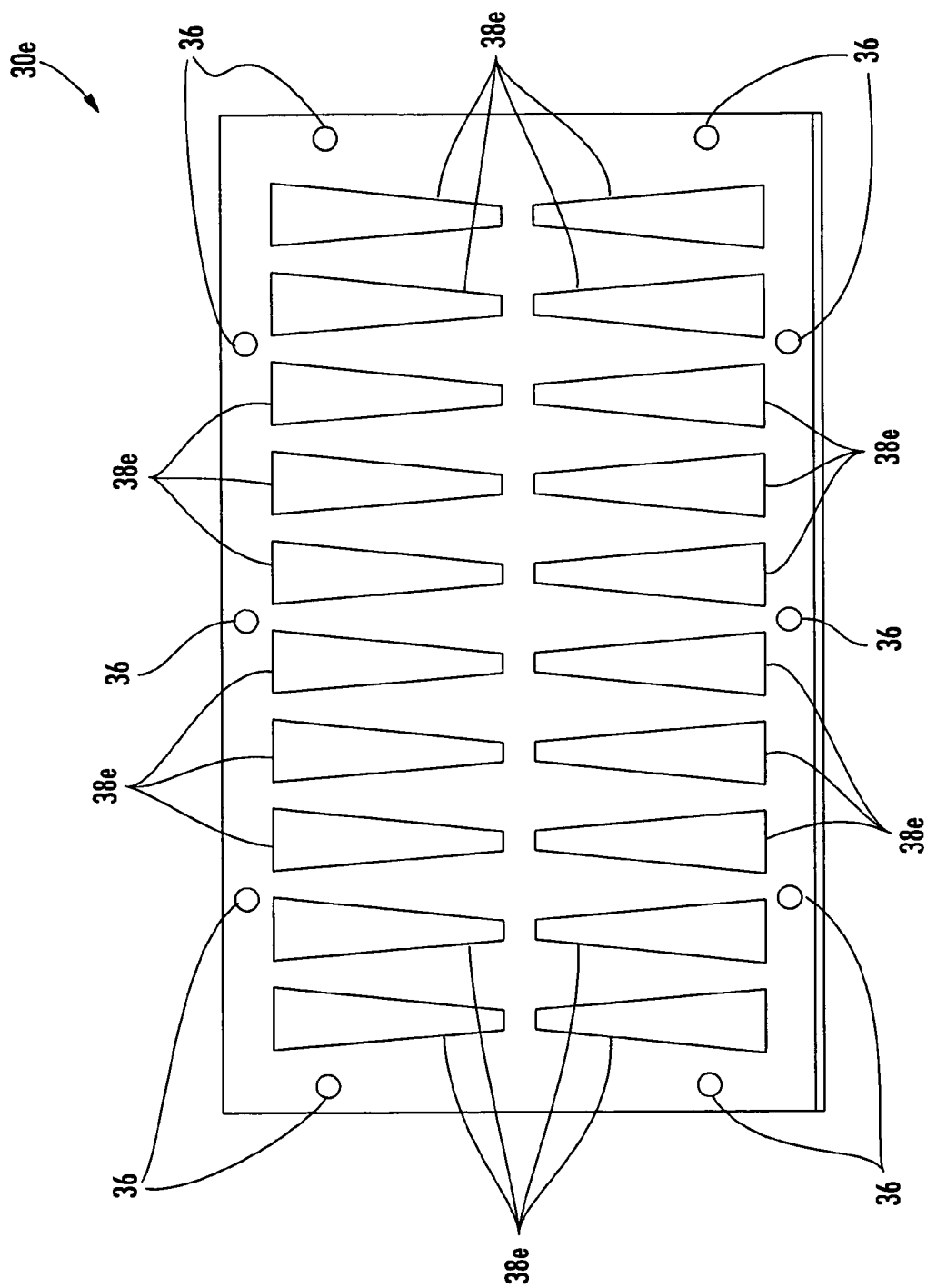
FIG. 13 is a schematic, pictorial view of a representative mounting member of a burner unit of another embodiment of the present invention.
Figure 14:
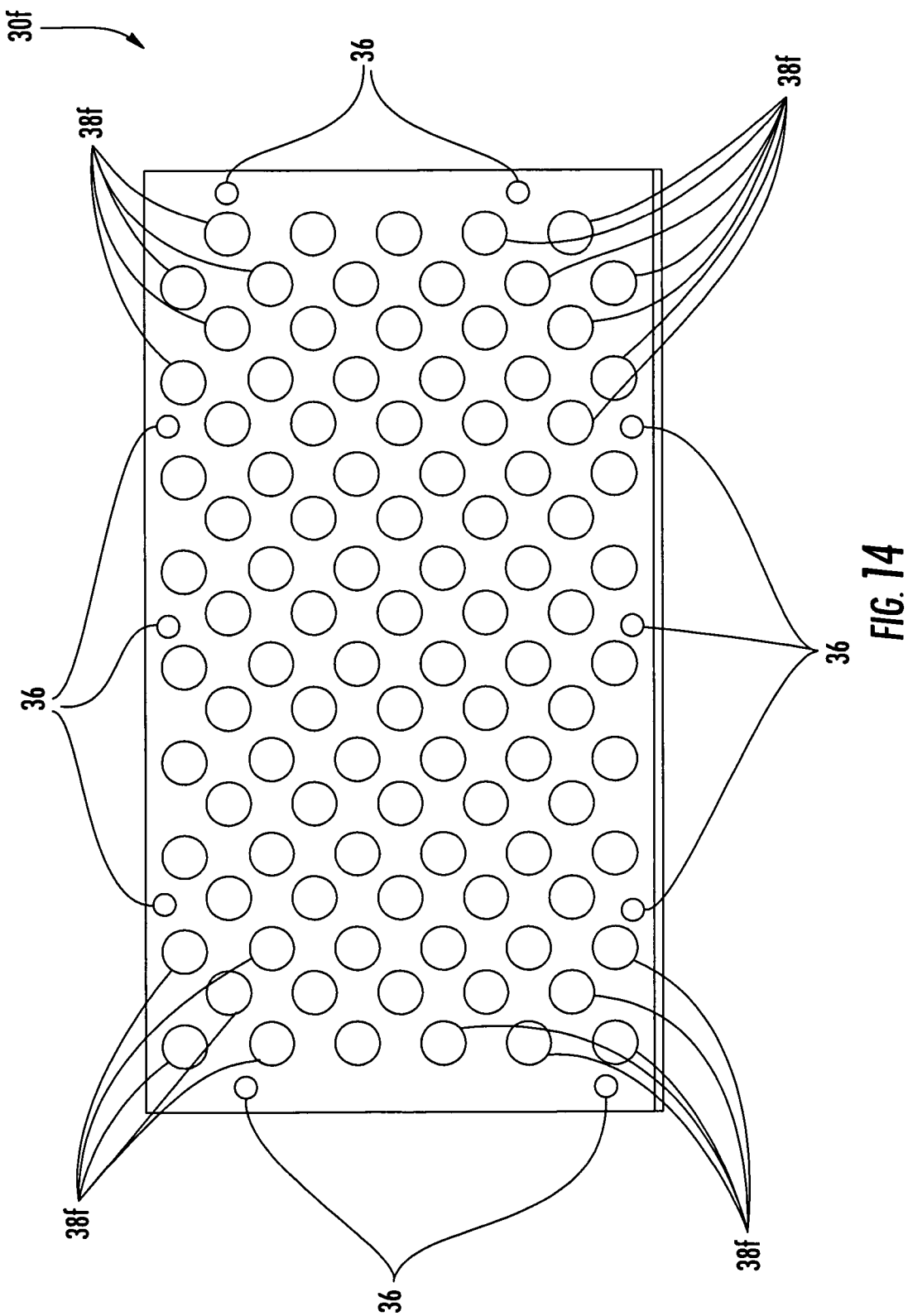
FIG. 14 is a schematic, pictorial view of a representative mounting member of a burner unit of another embodiment of the present invention.

With the solid emitter 24, the slot-like exhaust opening 62 between the upper surface of the burner assembly 22 and the lower surface of the emitter 24 not only allows for the products of combustion to be discharged, but it is also sufficiently narrow so that it seeks to prevent secondary air from reaching the burner assembly 22 (i.e., reaching the combustion/flames that emanate from the downstream surface of the burner assembly 22 and are schematically represented by the series of vertical arrows in FIG. 3). As illustrated in FIGS. 1 and 8, the upright flange 34, which extends around and upwardly from the baffle assembly 26, extends to a position above the downstream surface of the burner assembly 22, so that the exhaust opening 62 is defined between the upper edge of the upright flange 34 and the bottom surface of the emitter 24. FIG. 8 is schematic, for example, because its scale is not sufficiently large to individually crosshatch the respective parts of the burner and baffle assemblies 22, 26; therefore, the burner and baffle assemblies are schematically illustrated together/crosshatched together as a single component. In accordance with the exemplary embodiment of the present invention, the distance between the upper edge of the upright flange 34 and the bottom surface of the emitter 24 is about 0.500 inches in the vertical direction. The exhaust opening 62 for discharging the products of combustion can be omitted when the emitter 24 includes a sufficient number of apertures therethrough or is replaced with a screen-like emitter.

The performance of the burner unit 20 is dictated, in part, by the emissivity of the emitter 24. Emissivity is a factor that indicates the ability of a surface to absorb or radiate infrared energy at the same temperature. A perfect emitter (black body) or absorber would have an emissivity of one. All other emissivities are a fraction of one. It has been widely accepted that, in general, metal has low emissivity and other material, such as ceramic, has emissivities of about 0.9. Therefore, metal generally would not be considered a good emitting surface for a radiant type burner. However, certain alloys of metal, when oxidized, become very good emitters and possess the strength and durability not found in most ceramic type materials. As an example, oxidized nichrome wire heated to about 500° C. (932° F.) can possess an emissivity above 0.95.

Since, in accordance with the exemplary embodiment, the emitter 24 is in close proximity to the burner assembly 22 (e.g., within less than 1 inch), the emissivity of the burner assembly 22 is not as important to the operation of the burner unit 20 as is the emissivity of the emitter 24. This configuration of the burner unit 20 can be characterized as there being two parallel planes, one radiating to the other in close proximity. Since the exhaust opening 62 between the perimeters of the burner assembly 22 and the emitter 24 is narrow (e.g., less than one inch), the majority of the energy will be absorbed by the emitter even if the energy is reflected from the emitter back to the burner assembly. The amount of energy lost through the exhaust opening 62 around the perimeter will be negligible because the intensity of the emitted energy decreases as the angle between the normal and that of the emission increases. In other words, the maximum energy is emitted normal to the surface of the emitting element and decreases to zero at zero angle to the surface.

The burner unit 20 of the exemplary embodiment of the present invention has many advantages and associated features, and some of them have been described above, and some of them will be described in the following, but they are not being described herein for the purpose of narrowing the scope of the present invention. As one example of an advantage, the burner unit 20 can eliminate the fragility of existing type ceramic burner emitting elements since the burner and baffle assemblies 22, 26 can be completely constructed of metal.

Additionally, the burner unit 20 is also highly resistant to flashbacking and can be fired at rates more than triple that of at least some conventional infrared burners based on BTUH/$in^2$ of surface area of the emitter 24. In this regard, traditional studies of the concept of critical boundary velocity gradient as a rational means of correlating flame flashback and blow off stability limits do not completely apply to the burner unit 20. As an example, in a study of Structure and Propagation of Laminar Flames by Thomas and Wilhelm (U.S. Air Force Contract No. A.F. 33(038140976)) it was shown that the quenching distance for methane-air flames are 0.32 cm (0.126 inches) for a tubular orifice and 0.250 cm (0.098 inches) for a rectangular orifice. In the burner unit 20 of the exemplary embodiment, these determined quenching distances would result in flashback and burner failure. The difference is that in the burner unit 20 of the exemplary embodiment, there is little or no thermal quenching and the quenching of the flame is more by material diffusion.

When the gas-air mixture passes through the multiple layers of the perforated members 25 in the burner unit 20, a secondary method of quenching the flame is introduced. When multiple layers of perforated members 25 are used, the chambers 58 (e.g., air gaps) illustrated in FIG. 3 are formed between the layers of perforated members. Advantageously, these chambers 58 can function to lower the temperature of the gas-air mixture in the plenum 32 and thereby increase the ability to inject combustion air into the plenum 32 by the venturi 50. Since metal (which is what the perforated members 25 are constructed from in accordance with the first exemplary embodiment) has almost infinite thermal conductivity, both the upper and lower surfaces of the perforated members of the burner assembly 22 are at about the same temperature. The perforated members 25 of the baffle assembly 26 block the radiation from the underside of the perforated members 25 of the burner assembly 22. The perforated members 25 of the baffle assembly 26 also form a thermal boundary layer between the perforated members 25 of the burner assembly 22 and the plenum 32. It is not necessary that the perforated members 25 of the baffle assembly 26 be made of the same materials as the perforated members 25 of the burner assembly 22 or that they have the same dimensions. However, to provide for the maximum protection against any type of flashback, at least the perforated members 25 in the baffle assembly 26 should be capable of quenching the flame even if they are fabricated of a relatively less expensive alloy such as 304 stainless steel.

In some embodiments of the present invention, only a single layer of one or more perforated members 25 is used and is sufficient; however, the performance of the burner unit 20 is improved (lower gas-air mixture temperatures in the plenum 32 and increased resistance to flashback) when multiple layers of the perforated members 25 are employed and spaced in series and relatively close to each other (e.g., adjacent perforated members 25 that are in series with respect to one another are spaced apart by less than about 0.250 inches).

Advantageously, the burner unit 20 of the exemplary embodiment can operate on 100% primary air (i.e., air provided by way of the venturi 50) for complete combustion using the venturi 50. That is, the air for providing complete combustion is 100% primary air that is air mixed with the supplied gas and provided by way of the venturi 50 at normal operating gas pressures. It is possible for the burner unit 20 to operate with 100% primary air for combustion using the venturi 50 because, for example, of the low pressure drop across the thin perforated members 25. Because the burner unit 20 does not require secondary air for combustion, the burner assembly 22 can be positioned in close proximity to the object to be heated (e.g., less than about one inch), namely the emitter 24 that absorbs the infrared radiation and energy from the products of combustion to re-radiate infrared energy to the object (e.g., food) to be heated (e.g., cooked). In accordance with an alternative embodiment of the present invention, the burner unit 20 does not necessarily operate on 100% primary air.

In accordance with the exemplary embodiment of the present invention, the burner unit 20 is operative so that all of the air required for completing the combustion is provided via the conventional venturi 50 throughout the operating range of the burner unit 20, with the operating range including, for example and not for purposes of limitation, all firing rates between and including 350 BTUH/$in^2$ of the burner unit's emitting surface and about 1,000 BTUH/$in^2$ of the burner unit's emitting surface. In the immediately foregoing, for the purposes of providing specific examples, the burner unit 20 has been described as operating with 100% primary air for combustion using the conventional venturi 50. However and more generally, it is also within the scope of the present invention for the burner unit 20 to be operative for so that substantially all of the air required for completing the combustion is provided via the conventional venturi 50 throughout the operating range of the burner unit 20, with the operating range including, for example and not for purposes of limitation, all firing rates, between and including 350 BTUH/$in^2$ of the burner unit's emitting surface and about 1,000 BTUH/$in^2$ of the burner unit's emitting surface.

In accordance with the exemplary embodiment, it is advantageous to the efficiency of the burner unit 20 that the burner unit can and does operate on 100% primary air. As a result, the combustion gases emanating from combustion/flames that emanate from the burner assembly 22 are not cooled or diluted by any secondary air until after these combustion gases are discharged from the burner unit 20 by way of the peripheral exhaust opening 62. At least partially as a result, the burner unit 20 can operate up to about 1,000 BTUH/$in^2$ without flashbacking. Since the emitted radiant energy is a function of the temperature of the emitter 24 (in R°) to the fourth power, it is important to maintain the highest temperature possible of the emitting surface for a fixed input of energy. The high inputs per unit area of burner assembly 22 is possible, in part, because of the burner assembly's ability to optimally quench the flame and thereby restrict flashback. The flame can be quenched by the use of one or more perforated members 25 in a single layer, but when two layers of the perforated members are used in series and are spaced apart by less than about 0.250 inches it becomes almost impossible to flashback the burner unit 20 due to over-firing. Perforated members 25 of adjacent layers can be spaced apart by a distance that is in the range of about 0.050 inches to about 0.250 inches, and in one specific example, they are spaced apart by about 0.0625 inches. That is, and as best understood with reference to FIG. 3, each of the chambers 58 provides a gap (e.g., thermal boundary layer) between perforated members 25, with the gap being a less than about 0.250 inches, or more specifically the gap being in the range of about 0.050 inches to about 0.250 inches, or even more specifically the gap being about 0.0625 inches. Even when a perforation 56 of one of the perforated members 25 of the burner assembly 22 is damaged so that it is enlarged to a diameter that will allow retrogression of the flame, flashbacking into the plenum 32 does not occur because the perforated member that is in series with/upstream from the damaged perforated member will quench the flame and thereby prevent any flashback.

The configuration of the mask holes 38 in the burner assembly 22 (e.g., the size, shape and arrangement of the exposed portions of the perforated members 25 in the burner assembly) can at least partially control the radiant output of the burner assembly, including the pattern in which the infrared energy is emitted from the burner assembly. The perforated members 25 can comprise most of the surface of the burner assembly 22 or only a small percentage of it. Accordingly, the energy emitted from the surface of the burner unit 20 can be adjusted to the requirements of the heat transfer process. That is, the mask holes 38/pattern of perforations 56 can be varied in size, geometric shape, and location based on the desired distribution and intensity of the emitted energy.

In accordance with the exemplary embodiment of the present invention, each of the burner and baffle assemblies 22, 26 has an open area (i.e., the flow area which is the sum of the areas of the exposed/open perforations 56 of the assembly) that does not exceed more than about 60% of the total area of the assembly in a plan view of the assembly. In accordance with a more specific example, each of the burner and baffle assemblies 22, 26 has an open area that does not exceed more than about 50% of the total area of the assembly in a plan view of the assembly. In one specific example, each of the burner and baffle assemblies 22, 26 has an open area that does not exceed more than about 33% of the total area of the assembly in a plan view of the assembly.

The perforated members 25/perforations 56 can be dispersed over the surface of the burner and baffle assemblies 22, 26 so that they only occupy, or are only exposed at, a portion of the surface of the burner and baffle assemblies. The perforated members 25 can be arranged and/or exposed/masked in a manner that will allow the radiant energy to be varied in its intensity over the surface of the burner assembly 22. As a contrasting example, in a typical prior art radiant burner, the maximum energy is usually emitted from the center of the burner. In contrast, in the burner unit 20, the perforated members 25 of the burner assembly 22 can be concentrated toward/around the perimeter of the burner assembly so that there is a relative decrease in the radiant energy emitted from the center, so that a very uniform distribution of the energy can be provided. That is, the perforated members 25/perforations 56 in the burner assembly can be systematically located over the surface of the burner assembly 22 (e.g., due to the configuration of the mask holes 38) to influence the intensity and distribution of the radiant energy.

Figure 20:
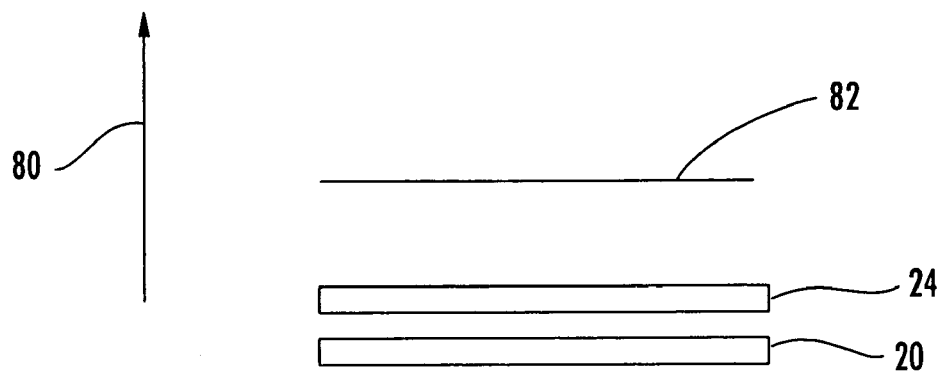
FIG. 20 is a chart that schematically illustrates a substantially uniform distribution of infrared radiant energy over an emitter, in accordance with one aspect of the present invention.

In accordance with one aspect of the present invention, the perforated members 25 are arranged and/or exposed/masked in a predetermined manner so that the emitter 24 is nonuniformly heated in a predetermined manner, so that the infrared radiant energy over the emitter is substantially equally distributed. As one example of this aspect, the perforated members 25 can be exposed/masked in a predetermined manner so that the burner unit 20 provides more heating proximate its perimeter, as a result of the mask holes being arranged, for example and not limitation, as at least generally illustrated in FIG. 2, 4, 6, 10, or 12, or the like. This aspect of the present invention is schematically illustrated by FIG. 20. FIG. 20 is a chart that includes an upright arrow 80 and a horizontal line 82. The upright arrow 80 provides a frame of reference about the intensity of infrared radiant energy over the emitter 24 in BTUH/in$^2$. The horizontal line 82 illustrates how the intensity of infrared radiant energy varies, if at all, over the surface of the emitter 24. That is, the substantially straight line 80 in FIG. 20 indicates that there is a substantially uniform level of radiation intensity over the emitter 24, and this is the result of the burner unit 20 nonuniformly heating the emitter 24 in the predetermined manner. In accordance with one example, the infrared radiant energy over the emitter 24 is substantially equally distributed over at least about a square foot. In accordance with this and other aspects, the predetermined arrangement of open perforations 56 (e.g., holes) can be achieved, for example, without the mounting members and their mask holes, such as, in one example, by arranging the perforations in the predetermined manner.

Figure 21:
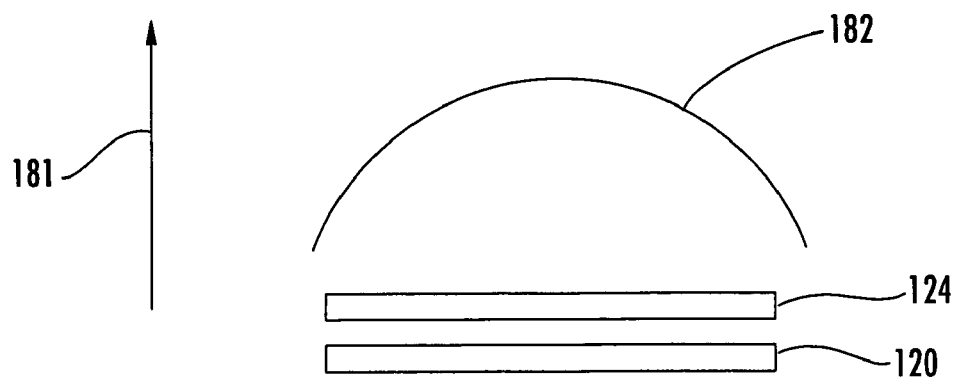
FIG. 21 is a chart that schematically illustrates a nonuniform distribution of infrared radiant energy over an emitter.

In contrast to FIG. 20, FIG. 21 is a chart that schematically illustrates the uneven distribution of infrared radiant energy over an emitter 124 positioned over a burner unit 120 that uniformly heats the emitter 124. The chart of FIG. 21 includes an upright arrow 180 and a horizontal line 182. The upright arrow 180 provides a frame of reference about the intensity of infrared radiant energy over the emitter 124 in BTUH/in$^2$. The horizontal line 182 illustrates how the intensity of infrared radiant energy varies significantly over the surface of the emitter 124, with the greatest intensity being in the middle.

Figure 15:
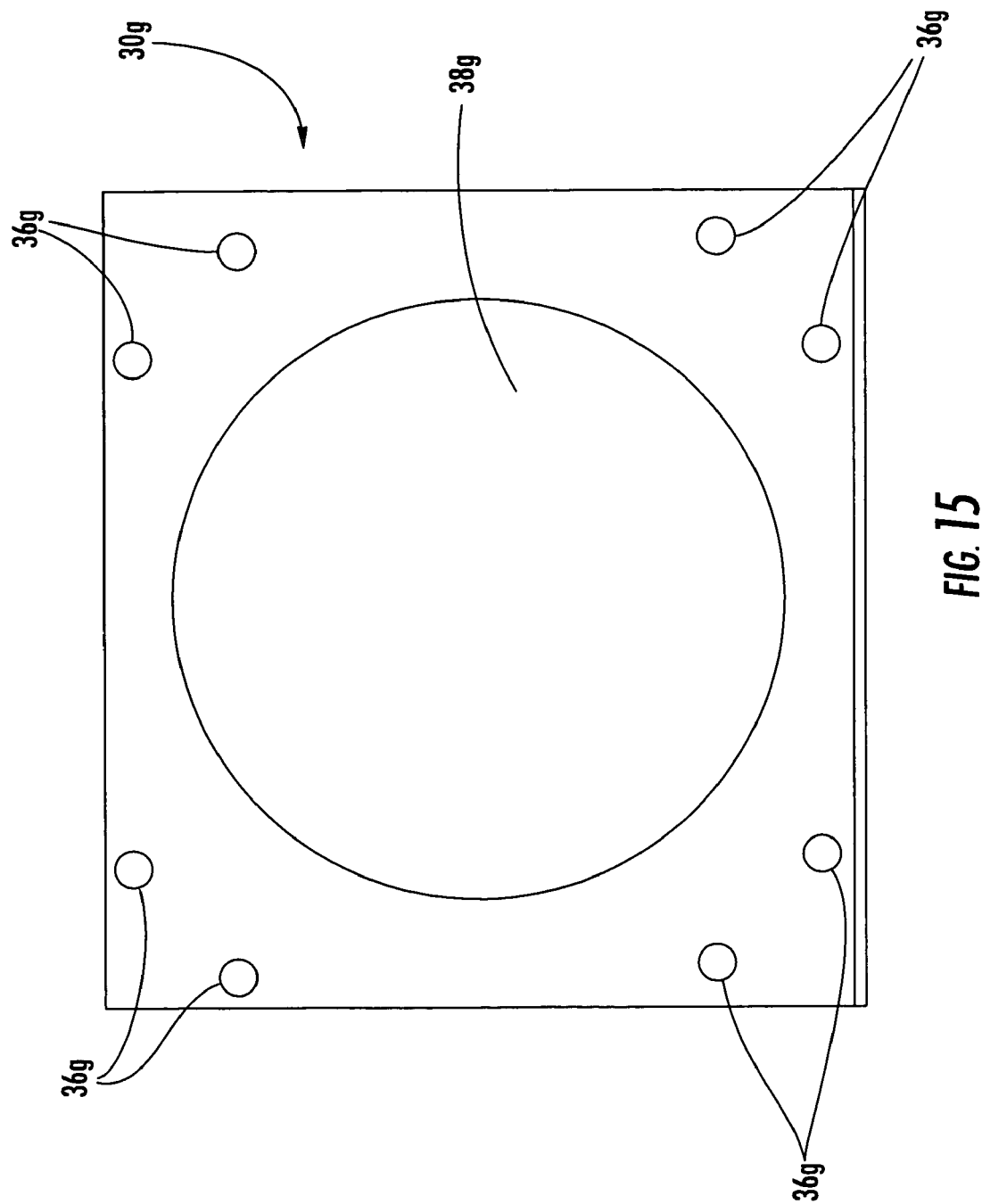
FIG. 15 is a schematic, pictorial view of a representative mounting member of a burner unit of another embodiment of the present invention.

The mask holes 38 of the burner assembly 22 and baffle assembly 26 can be located in various spaced relationships and the geometry of the mask holes 38 can vary widely to accommodate different radiant heat transfer requirements. When the burner unit 20 is put to a use that requires high levels of infrared radiation energy, the areas in which the perforated members 25 (i.e., the size of the mask holes 38) are increased to provide for sufficient flux density of infrared radiation energy based on the applications. At one extreme, the exposed area of the one or more perforated members 25 of the burner assembly 22 can essentially equal the entire area of the outlet opening 48 of the plenum 32, except for the relatively small peripheral frame-like outer mounting member (e.g., see the frames 70 and 72 in FIG. 16) that would likely be provided to support the perimeter of the associated perforated member. For example, FIG. 15 illustrates a mounting member 38g with a single, relatively large mask hole 38g such that the exposed area of the associated perforated member(s) 25 would be relatively large. On the other hand, the one or more perforated members 25 of the burner assembly 22 can be only a small percentage of the emitting surface of the burner assembly.

Some of the possible variations in the shapes and arrangements of the mask holes 38 are illustrated in FIGS. 9-15, which respectively are schematic, isolated pictorial views of representative mounting members 30a, 30b, 30c, 30d, 30e, 30f, 30g of burner units of other embodiments of the present invention. The other embodiments of the present invention that are respectively partially illustrated by FIGS. 9-15 are each like the exemplary embodiment of the present invention illustrated in FIGS. 1-8, or alternatively like the embodiment of FIG. 16, except for variations noted and variations that will be apparent to those of ordinary skill in the art. For example, the mask holes 38a, 38b, 38c, 38d, 38e, 38f, 38g of the mounting members 30a, 30b, 30c, 30d, 30e, 30f, 30g differ in location and/or geometry from the mask holes 38 of the mounting members 30 of the exemplary embodiment. Nonetheless there are some similarities. For example, in the embodiments of FIGS. 9-15, perforated members like the perforated members 25j of the embodiment of FIG. 16 can be used; and/or perforated members like the perforated members 25 of the exemplary embodiment can be used, although the overall size and/or shape of the perforated members may need to be changed to generally respectively conform to the configurations of the mask holes. Only a representative few of the mask holes 38f are identified by their reference numeral in FIG. 14 in an effort to clarify the view; nonetheless, it should be apparent that the mask holes 38f are arranged in a generally continuous and repeating pattern.

As one example of the similarities, for each of the burner and baffle assemblies (e.g., partitions) constructed according to the embodiments respectively partially illustrated by FIGS. 6, 9, 10, 11, 12 and 13, the perforations 56 (e.g., holes) respectively open to the mask holes 38, 38a, 38b, 38c, 38d, 38e are arranged in a predetermined manner so that there are less of the perforations per unit area in a central portion of the assembly than there are in an intermediate portion of the assembly, with the intermediate portion of the assembly being between the central portion of the assembly and a marginal portion of the assembly. This aspect can be more generally described in the context of a partition for at least partially defining a flow path in a gas-fired burner that generates combustion (e.g., flames) and infrared radiation, with the partition including a multiplicity of holes extending through the partition for at least partially defining a flow path for providing at least the gas to the combustion, wherein the multiplicity of holes are arranged in a predetermined manner so that there are less of the holes per unit area in a central portion of the partition than there are in an intermediate portion of the partition, with the intermediate portion of the partition being between the central portion of the partition and a marginal portion of the partition. More specifically, one or more edges of the partition extends around the marginal portion, the marginal portion extends around the intermediate portion, and the intermediate portion extends around the central portion. In accordance with alternative embodiments of the present invention, these same arrangements of open perforations 56 (e.g., holes) are achieved without the mounting members and their mask holes, such as, in one example, by replacing each of the burner and baffle assemblies with a single perforated plate with the perforations thereof arranged in the predetermined manner.

As another example of the similarities, for each of the burner and baffle assemblies (e.g., partitions) constructed according to the embodiments respectively partially illustrated by FIGS. 6, 9, 10, 11, 12, 13 and 14, the adjacent mask holes 38, 38a, 38b, 38c, 38f are substantially farther apart than adjacent perforations 56 (e.g., holes) open to the same mask hole. This aspect can be more generally described in the context of a partition for at least partially defining a flow path in a gas-fired burner that generates combustion and infrared radiation, with the partition including a multiplicity of holes extending through the partition for at least partially defining a flow path for providing at least the gas to the combustion, wherein pluralities of first and second areas of the partition are arranged in an alternating series, with the holes being respectively arranged in the first areas, the first areas each including a multiplicity of the holes, the second areas being absent of the holes, and adjacent pairs of the second areas being substantially farther apart than adjacent pairs of the holes in a first area of the first areas. In accordance with alternative embodiments of the present invention, these same arrangements of open perforations 56 (e.g., holes) are achieved without the mounting members and their mask holes, such as, for example, by replacing each of the burner and baffle assemblies with a single perforated plate with the perforations thereof arranged in a predetermined manner.

In accordance with another aspect illustrated in FIGS. 6, 10, 12 and 13, at least some of the mask holes 38, 38b, 38d, 38e include an inner portion and an outer portion, with the outer portion being closer to the mounting member's marginal portion (e.g., the partition's marginal portion) than the inner portion, and the outer portion being wider than the inner portion. This aspect can be more generally described in the context of a partition for at least partially defining a flow path in a gas-fired burner that generates combustion and infrared radiation, with the partition including a multiplicity of holes extending through the partition for at least partially defining a flow path for providing at least the gas to the combustion, wherein pluralities of first and second areas of the partition are arranged in an alternating series, with the holes being respectively arranged in the first areas, the first areas each including a multiplicity of the holes, the second areas being absent of the holes, and at least one of the first areas includes an inner portion and an outer portion, with the outer portion being closer to the partition's marginal portion than the inner portion, and the outer portion being wider than the inner portion. In accordance with alternative embodiments of the present invention, these same arrangements of open perforations 56 (e.g., holes), and other arrangements of open perforations 56 (e.g., holes), can be achieved without the mounting members and their mask holes, such as, for example, by replacing each of the burner and baffle assemblies with a single perforated plate with the perforations thereof arranged in a predetermined manner.

Figure 16:
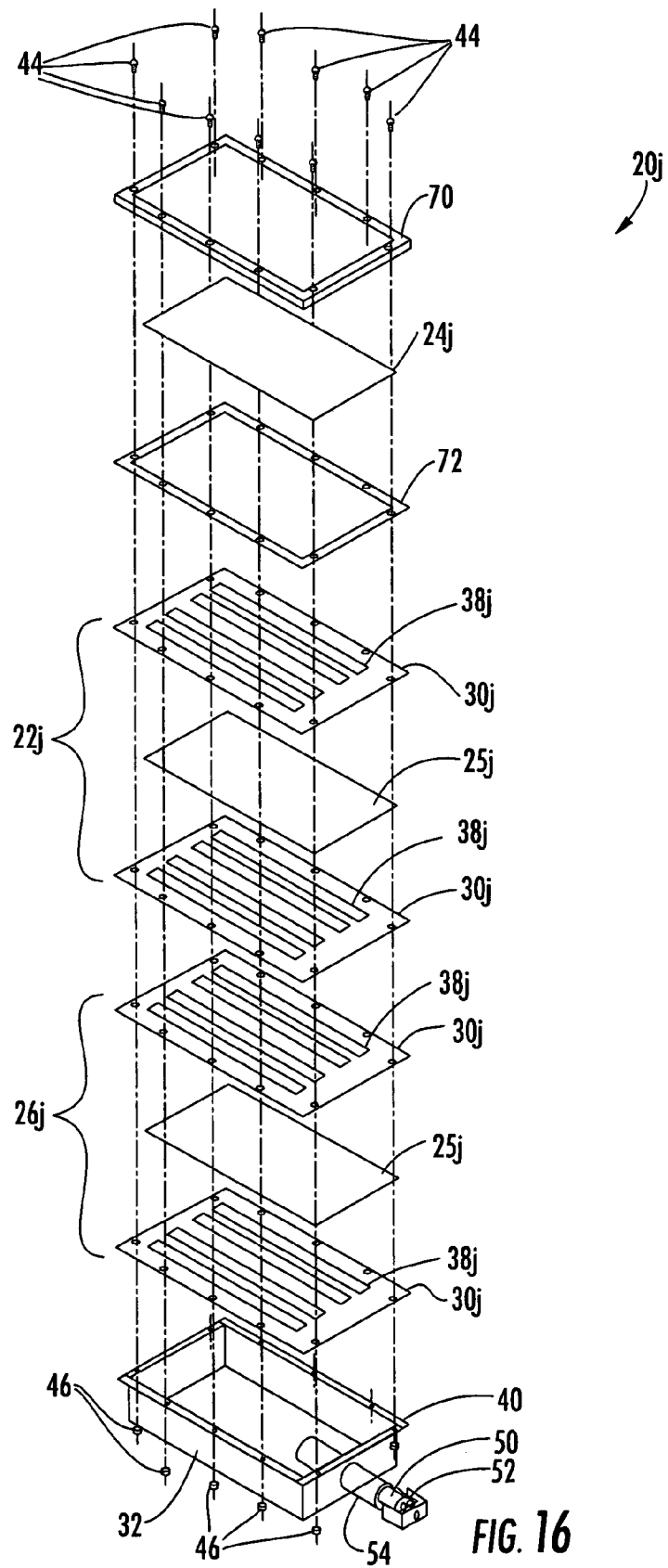
FIG. 16 is a schematic, exploded view of a burner unit in accordance with another embodiment of the present invention.

FIG. 16 is a schematic exploded view of the burner unit 20j in accordance with another embodiment of the present invention. The burner unit 20j of FIG. 16 is like the burner unit 20 of the exemplary embodiment of the present invention except for variations noted and variations that will be apparent to those of ordinary skill in the art. For the burner unit 20j, the emitter 24j is in the form of a nichrome woven screen, or the like, that is retained by frames 70 and 72. The woven screen emitter 24j by definition has a multiplicity of open areas extending therethrough; therefore, the exhaust opening 62 of the exemplary embodiment is omitted from the embodiment of FIG. 16, because the exhaust gases (products of combustion) can be discharged through the woven screen emitter 24j.

Another difference between the embodiment of FIG. 16 and the exemplary embodiment is that each of the burner and baffle assemblies 22j, 26j includes only a single perforated member 25j that is broad enough to cover all of the respective mask holes 38j of the mounting members 30j. The perforated members 25j can be like the perforated members 25 of the exemplary embodiment, except for the overall size of the perforated members 25j being larger than the overall size of the perforated members 25 of the exemplary embodiment. Another difference between the embodiment of FIG. 16 and the exemplary embodiment is the size and shape of the mask holes 38j. This difference provides an example of how the radiant energy output of a burner of this invention can be controlled as to intensity and location over the burner surface.

Figure 17:
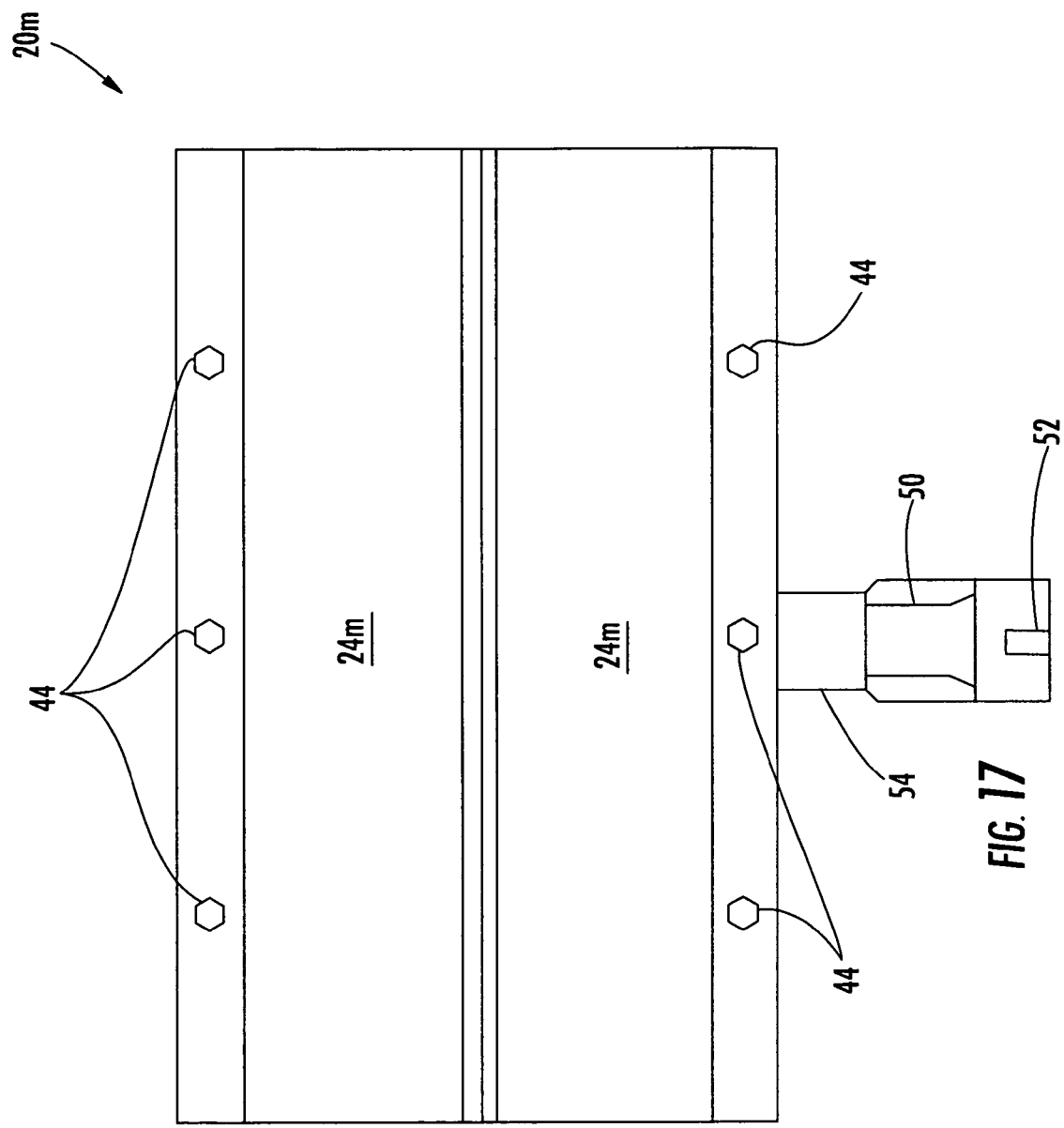
FIG. 17 is a schematic, top plan view of a burner unit in accordance with another embodiment of the present invention.
Figure 18:
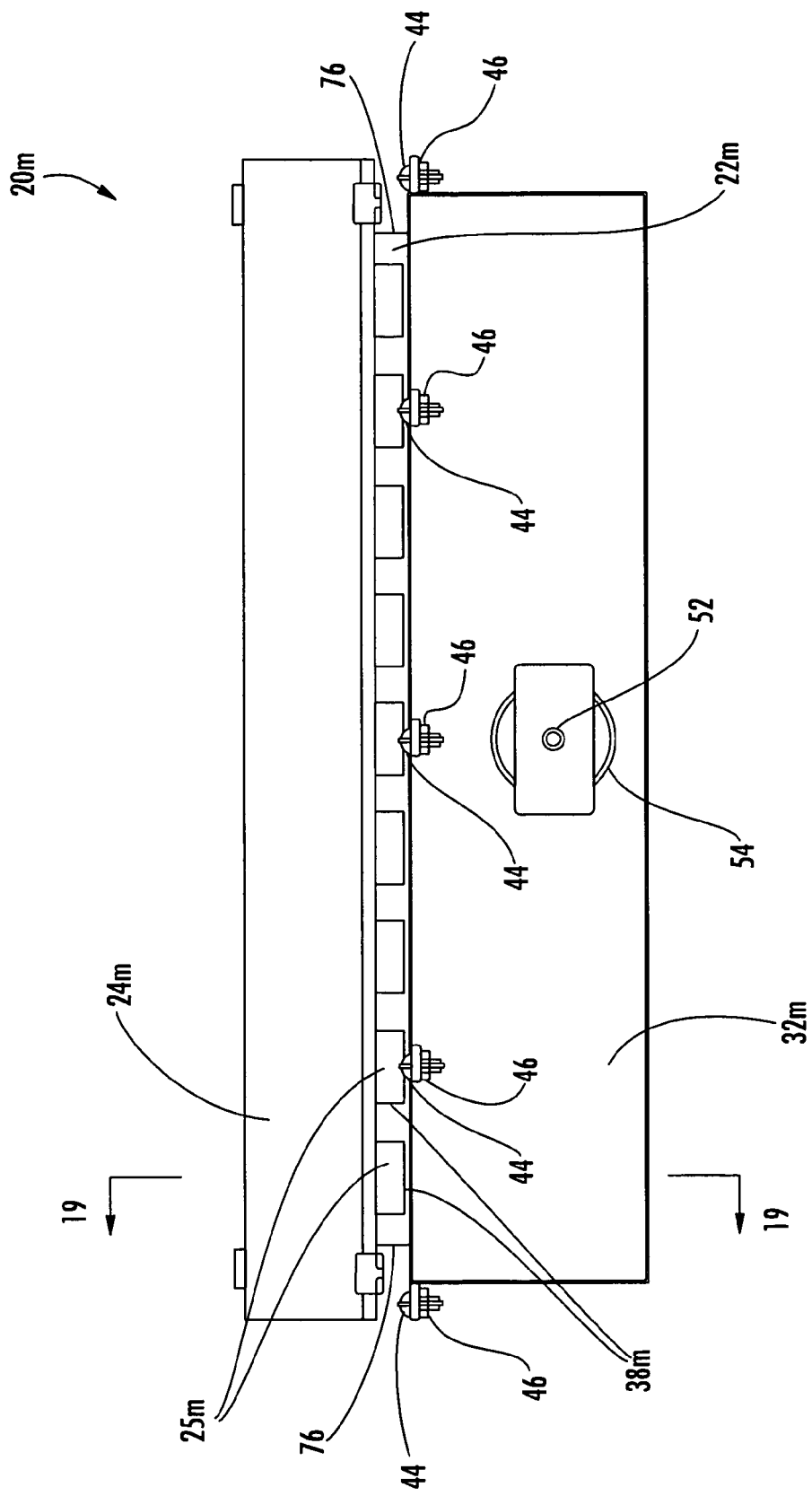
FIG. 18 is a schematic, elevation view of the burner unit of FIG. 17.
Figure 19:
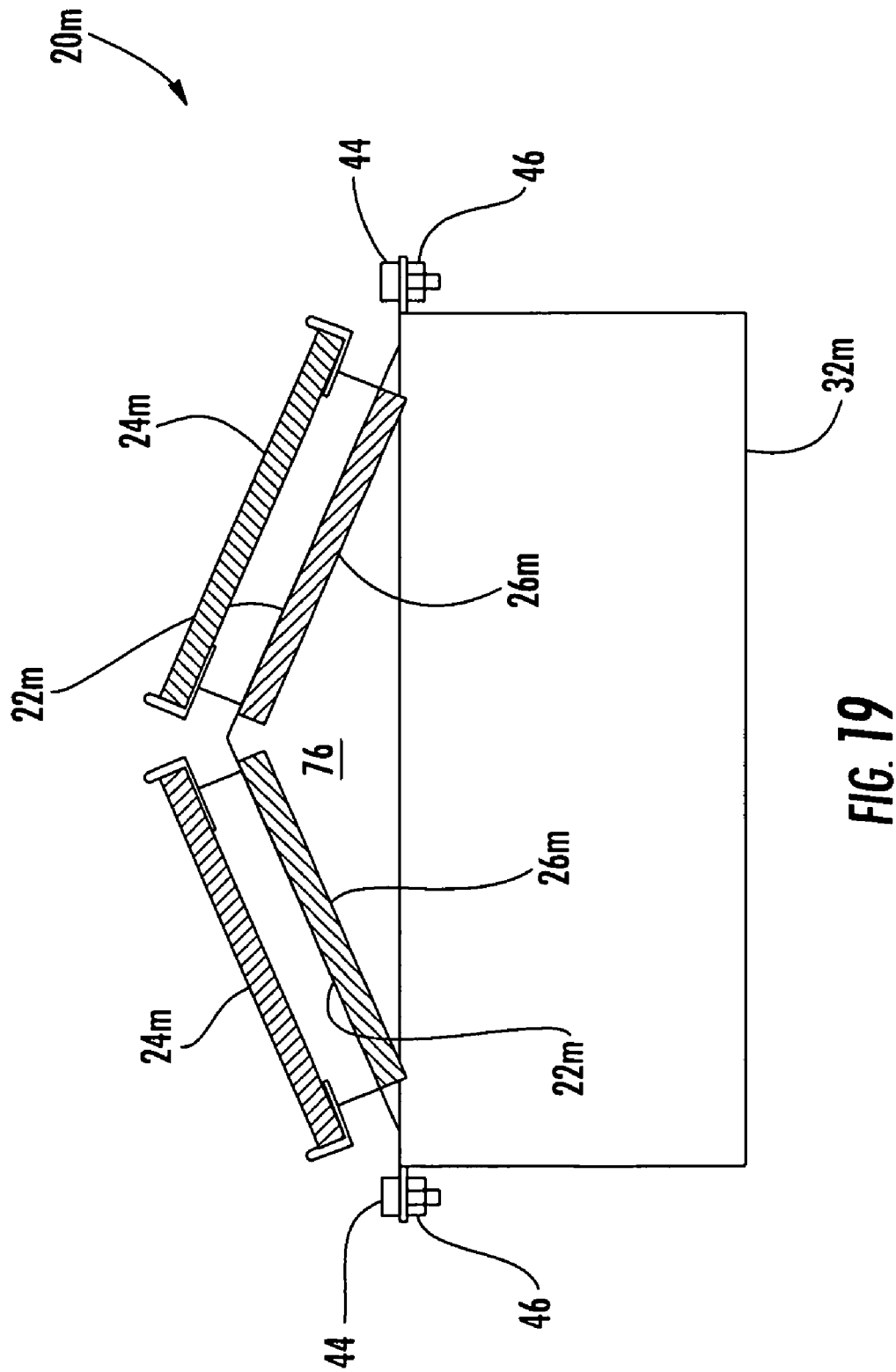
FIG. 19 is a schematic, cross-sectional view of the burner unit take along line 19-19 of FIG. 18.

FIGS. 17-19 schematically illustrate a burner unit 20m in accordance with another embodiment of the present invention, and the embodiment of FIGS. 17-19 is generally like the exemplary embodiment of the present invention except for variations noted and variations that will be apparent to those of ordinary skill in the art. The burner unit 20m includes two of each of burner assemblies 22m, emitters 24m and baffle assemblies 26m, and these burner assemblies, emitters, baffle assemblies and associated components are angled relative to the plenum 32m and the horizon. Triangular end panels 76 and additional sealing structures, or other means, can be used so that the only flow path out of the plenum 32m is through the perforated members 25m of the burner assemblies 22m. FIG. 19 is schematic, for example, because its scale is not sufficiently large to individually crosshatch the respective parts of the burner and baffle assemblies 22m, 26m; therefore, the burner and baffle assemblies are schematically illustrated together/crosshatched together as a single component.

As described above, the burner unit 20 can be used for cooking. Nonetheless, the burner unit 20 can have a wide variety of applications. For example and not for the purpose of narrowing the scope of the present invention, the burner unit 20, with or without the emitter 24, can be incorporated into a water heater, and it can also be used to dry coatings, such as, but not limited to, paint. As one example, it may be desirable to replace the emitter 24 with a woven screen or a perforated plate when the burner of the present invention is used for drying coatings. As also described above, the burner unit 20 can provide a substantially uniform energy distribution. However, in some applications, a substantially uniform energy distribution is not required, and the present invention is not limited to a substantially uniform energy distribution.

It will be understood by those skilled in the art that while the present invention has been discussed above with reference to several embodiments, various additions, modifications and changes can be made thereto without departing from the spirit and scope of the invention as set forth in the following claims.

What is claimed is:

1. A gas-fired burner unit for providing combustion and infrared radiation, the gas-fired burner unit comprising:
   a plenum for receiving a gas-air mixture;
   a plurality of downstream perforated metal plates mounted for receiving the gas-air mixture from the plenum and supplying the gas-air mixture to the combustion so that the combustion emanates outwardly from proximate downstream sides of the downstream perforated metal plates, wherein the downstream sides of the downstream perforated metal plates are exterior surfaces of the burner unit, the exterior surfaces of the burner unit are for emitting infrared radiation outwardly from the burner unit, and the downstream perforated metal plates are less than about 0.125 inches thick;
   a plurality of upstream perforated metal plates that are respectively mounted in series with, and are positioned upstream from, the downstream perforated metal plates; and
   a mounting plate positioned between the upstream perforated metal plates and the downstream perforated metal plates so that the mounting plate is upstream of the downstream perforated metal plates, wherein the mounting plate has a plurality of holes that extend through the mounting plate, the holes have circumferential walls that respectively extend at least partially around, and thereby at least partially define, a plurality of chambers that are substantially discrete with respect to one another and positioned between the downstream perforated metal plates and the upstream perforated metal plates, and the chambers are wider than perforations of the upstream and downstream perforated metal plates, and wherein
      perforations of the downstream perforated metal plates are respectively open to the chambers, and
      perforations of the upstream perforated metal plates are respectively open to the chambers, so that for each chamber of the plurality of chambers,
         a downstream end of the chamber is obstructed by and defined by one of the downstream perforated metal plates,
         an upstream end of the chamber is obstructed by and defined by one of the upstream perforated metal plates,
         the chamber is adjacent to and in fluid communication with both a plurality of the perforations of the one of the downstream perforated metal plates and a plurality of the perforations of the one of the upstream perforated metal plates,
         the plurality of perforations of the one of the downstream perforated metal plates are for receiving the gas-air mixture from the plenum by way of the chamber, and
         the chamber is for receiving the gas-air mixture from the plenum by way of the plurality of perforations of the one of the upstream perforated metal plates; and
   at least one venturi mounted for providing the gas and air to the plenum, wherein the burner unit is operative so that substantially all of the air required for completing the combustion is provided via the at least one venturi while the burner unit's firing rate exceeds about 350 BTUH/in$^2$ of the burner unit's emitting surface.

2. The gas-fired burner unit according to claim 1, wherein downstream surfaces of the upstream perforated metal plates are respectively in opposing face-to-face relation with upstream surfaces of the downstream perforated metal plates, so that the downstream surfaces and the upstream surfaces respectively cooperate to at least partially define the chambers.

3. The gas-fired burner unit according to claim 1, wherein the mounting plate is in opposing face-to-face contact with both:
   downstream surfaces of the upstream perforated metal plates, and
   upstream surfaces of the downstream perforated metal plates.

4. The gas-fired burner unit according to claim 3, wherein the mounting plate comprises first and second mounting plates that are in opposing face-to-face contact with one another, and wherein:
   the first mounting plate is in opposing face-to-face contact with downstream surfaces of the upstream perforated metal plates, and
   the second mounting plate is in opposing face-to-face contact with upstream surfaces of the downstream perforated metal plates.

5. The gas-fired burner unit according to claim 1, wherein velocity of the gas-air mixture through the perforations of the downstream perforated metal plate is no more than about 80% of the combustion's flame speed.

6. The gas-fired burner unit according to claim 1 in combination with both an infrared energy emitter and a support for supporting food to be cooked, wherein:
   the infrared energy emitter is mounted proximate the downstream perforated metal plates for absorbing infrared radiation emitted from the downstream perforated metal plates, and
   the infrared energy emitter is positioned between the burner unit and the support, for emitting infrared radiation toward the support.

7. The gas-fired burner unit according to claim 1, wherein the burner unit is operative so that 100% of the air required for completing the combustion is provided via the at least one venturi while the burner unit's firing rate exceeds about 350 BTUH/in$^2$ of the burner unit's emitting surface.

8. The gas-fired burner unit according to claim 1, wherein the burner unit is operative so that substantially all of the air required for completing the combustion is provided via the at least one venturi while the burner unit's firing rate exceeds about 400 BTUH/in$^2$ of the burner unit's emitting surface.

9. The gas-fired burner unit according to claim 1, wherein the burner unit is operative so that substantially all of the air required for completing the combustion is provided via the at least one venturi while the burner unit's firing rate exceeds about 500 BTUH/in$^2$ of the burner unit's emitting surface.

10. The gas-fired burner unit according to claim 1, in combination with an infrared energy emitter, wherein the infrared energy emitter is adjacent the gas-fired burner unit for absorbing infrared radiation emitted from the gas-fired burner unit.

11. The combination according to claim 10, wherein the infrared energy emitter is within about an inch from the gas-fired burner unit.

12. A gas-fired burner unit for providing combustion and infrared radiation, the gas-fired burner unit comprising:
a plenum for receiving a gas-air mixture;
a downstream perforated metal plate mounted for receiving the gas-air mixture from the plenum and supplying the gas-air mixture to the combustion so that the combustion emanates outwardly from proximate a downstream side of the downstream perforated metal plate, wherein the downstream side of the downstream perforated metal plate is an exterior surface of the burner unit, the exterior surface of the burner unit is for emitting infrared radiation outwardly from the burner unit, and the downstream perforated metal plate is less than about 0.125 inches thick;
an upstream perforated metal plate that is mounted in series with, and is positioned upstream from, the downstream perforated metal plate;
a mounting plate, wherein
the mounting plate is positioned between the downstream perforated metal plate and the upstream perforated metal plate so that the mounting plate is upstream of the downstream perforated metal plate,
the mounting plate has a circumferential wall that at least partially extends around and defines a hole that extends through the mounting plate,
the hole in the mounting plate is wider than perforations of the upstream and downstream perforated metal plates,
the hole of the mounting plate at least partially defines a substantially discrete chamber between the downstream perforated metal plate and the upstream perforated metal plate,
a downstream end of the chamber is obstructed by and defined by the downstream perforated metal plate,
an upstream end of the chamber is obstructed by and defined by the upstream perforated metal plate, and
the chamber is in fluid communication with both a plurality of the perforations of the upstream perforated metal plate and a plurality of the perforations of the downstream perforated metal plate, so that
the plurality of perforations of the downstream perforated metal plate are for receiving the gas-air mixture from the plenum by way of the chamber, and
the chamber is for receiving the gas-air mixture from the plenum by way of the plurality of perforations of the upstream perforated metal plate; and
at least one venturi mounted for providing the gas and air to the plenum, wherein the burner unit is operative so that substantially all of the air required for completing the combustion is provided via the at least one venturi while the burner unit's firing rate exceeds about 350 BTUH/in$^2$ of the burner unit's emitting surface.

13. The gas-fired burner unit according to claim 12 in combination with an infrared energy emitter, wherein the infrared energy emitter is mounted proximate the downstream perforated metal plate for absorbing infrared radiation emitted from the downstream perforated metal plate.

14. The combination according to claim 13 further in combination with a support for supporting food to be cooked, wherein the infrared energy emitter is positioned between the burner unit and the support, for emitting infrared radiation toward the support.

15. The combination according to claim 13, wherein the burner unit is operative for nonuniformly heating the emitter in a manner so that the infrared radiation over the emitter is substantially uniformly distributed.

16. The combination according to claim 13, wherein the infrared energy emitter is solid.

17. The gas-fired burner unit according to claim 12, wherein the mounting plate is in opposing face-to-face contact with each of the upstream perforated metal plate and the downstream perforated metal plate.

18. The gas-fired burner unit according to claim 17, wherein the mounting plate comprises first and second mounting plates that are in opposing face-to-face contact with one another, and wherein:
the first mounting plate is in opposing face-to-face contact with the upstream perforated metal plate, and
the second mounting plate is in opposing face-to-face contact with the downstream perforated metal plate.

19. The gas-fired burner unit according to claim 12, wherein the downstream perforated metal plate and the upstream perforated metal plate are positioned sufficiently close to one another so that the combustion is restricted from traveling upstream through the chamber.

20. The gas-fired burner unit according to claim 12, wherein the downstream perforated metal plate and the upstream perforated metal plate are spaced apart by less than about 0.250 inches at the chamber.

21. The gas-fired burner unit according to claim 20, wherein the downstream perforated metal plate and the upstream perforated metal plate are spaced apart by at least about 0.050 inches at the chamber.

22. The gas-fired burner unit according to claim 20, wherein the downstream perforated metal plate and the upstream perforated metal plate are spaced apart by about 0.0625 inches at the chamber.

23. The gas-fired burner unit according to claim 12, wherein velocity of the gas-air mixture through the perforations of the downstream perforated metal plate is no more than about 80% of the combustion's flame speed.

24. The gas-fired burner unit according to claim 12, wherein the mounting plate is thicker than each of the upstream and downstream perforated metal plates.

25. The gas-fired burner unit according to claim 12, wherein the mounting plate obstructs some of the perforations of each of the upstream and downstream perforated metal plates.

26. The gas-fired burner unit according to claim 12, wherein:
the hole of the mounting plate is one of a plurality of holes that extend through the mounting plate,
groups of perforations of the downstream perforated metal plate are respectively aligned with, and respectively in communication with, the holes of the mounting plate, and
groups of perforations of the upstream perforated metal plate are respectively aligned with, and respectively in communication with, the holes of the mounting plate.

27. The gas-fired burner unit according to claim 12, wherein:
the mounting plate comprises first and second mounting plates that are in opposing face-to-face contact with one another; and
the hole comprises a hole extending through the first mounting plate being adjacent to and open to a hole extending through the second mounting plate.

28. The gas-fired burner unit according to claim 12, wherein:
the hole of the mounting plate is one of a plurality of holes that extend through the mounting plate,
the downstream perforated metal plate is one of a plurality of downstream perforated metal plates that are adjacent to the mounting plate,
groups of perforations of the downstream perforated metal plates are respectively aligned with, and respectively in communication with, the holes of the mounting plate,
the upstream perforated metal plate is one of a plurality of upstream perforated metal plates that are adjacent to the mounting plate, and
groups of perforations of the upstream perforated metal plates are respectively aligned with, and respectively in communication with, the holes of the mounting plate.

29. The gas-fired burner unit according to claim 28, wherein at least some of the holes, which extend through the mounting plate, are elongate.

30. The gas-fired burner unit according to claim 28, wherein:
the mounting plate is a first mounting plate;
the downstream perforated metal plate is sandwiched between the first mounting plate and a second mounting plate;
the holes of the first mounting plate are respectively at least generally aligned with, and in fluid communication with, holes of the second mounting plate,
perforations of the downstream perforated metal plate have smaller widths than the holes that extend through the first and second mounting plates, and
perforations of the downstream perforated metal plate are respectively between, and in communication with, at least some of the holes of the first and second mounting plates.

31. The gas-fired burner unit according to claim 30, wherein:
a surface of the first mounting plate is in opposing face-to-face contact with a downstream side of the downstream perforated metal plate, and
a surface of the second mounting plate is in opposing face-to-face contact with an upstream side of the downstream perforated metal plate.

32. The gas-fired burner unit according to claim 12, wherein:
the downstream perforated metal plate is one of a plurality of downstream perforated metal plates,
the upstream perforated metal plate is one of a plurality of upstream perforated metal plates that are respectively mounted in series with, and are positioned upstream from, the downstream perforated metal plates;
the hole of the mounting plate is one of a plurality of holes of the mounting plate,
the plurality of holes of the mounting plate at least partially define a plurality of chambers that are positioned between the downstream perforated metal plates and the upstream perforated metal plates,
each of the chambers has a larger width than the perforations of the upstream and downstream perforated metal plates,
upstream ends of perforations of the downstream perforated metal plates are respectively open to the chambers, and
downstream ends of perforations of the upstream perforated metal plates are respectively open to the chambers.

33. The gas-fired burner unit according to claim 32, wherein the chambers are substantially discrete with respect to one another.

34. The gas-fired burner unit according to claim 32, wherein downstream surfaces of the upstream perforated metal plates are respectively in opposing face-to-face relation with upstream surfaces of the downstream perforated metal plates, so that the downstream surfaces and the upstream surfaces respectively cooperate to at least partially define the chambers.

35. The gas-fired burner unit according to claim 32, wherein the plurality of holes of the mounting plate have circumferential walls that respectively extend at least partially around, and thereby at least partially define, the chambers.

36. The gas-fired burner unit according to claim 35, wherein the mounting plate is in opposing face-to-face contact with both:
downstream surfaces of the upstream perforated metal plates, and
upstream surfaces of the downstream perforated metal plates.

37. The gas-fired burner unit according to claim 36, wherein the mounting plate comprises first and second mounting plates that are in opposing face-to-face contact with one another, and wherein:
the first mounting plate is in opposing face-to-face contact with the upstream perforated metal plates, and
the second mounting plate is in opposing face-to-face contact with the downstream perforated metal plates.

38. The gas-fired burner unit according to claim 12, wherein perforations of the downstream perforated metal plate have a width in a range of about 0.025 inches to about 0.062 inches.

39. The gas-fired burner unit according to claim 38, wherein the width is in a range of about 0.030 inches to about 0.060 inches.

40. The gas-fired burner unit according to claim 12, wherein the downstream perforated metal plate has a thickness within a range of about 0.0156 inches to about 0.0625 inches.

41. The gas-fired burner unit according to claim 12, wherein perforations of the downstream perforated metal plate are placed on straight centers within a range of about 0.040 inches to about 0.080 inches.

42. The gas-fired burner unit according to claim 12, wherein the burner unit is operative so that 100% of the air required for completing the combustion is provided via the at least one venturi while the burner unit's firing rate exceeds about 350 BTUH/in$^2$ of the burner unit's emitting surface.

43. The gas-fired burner unit according to claim 12, wherein the burner unit is operative so that substantially all of the air required for completing the combustion is provided via the at least one venturi while the burner unit's firing rate exceeds about 400 BTUH/in$^2$ of the burner unit's emitting surface.

44. The gas-fired burner unit according to claim 12, wherein the burner unit is operative so that substantially all of the air required for completing the combustion is provided via the at least one venturi while the burner unit's firing rate exceeds about 500 BTUH/in² of the burner unit's emitting surface.

45. The gas-fired burner unit according to claim 12, in combination with an infrared energy emitter, wherein the infrared energy emitter is adjacent the gas-fired burner unit for absorbing infrared radiation emitted from the gas-fired burner unit.

46. The combination according to claim 45, wherein the infrared energy emitter is within about an inch from the gas-fired burner unit.

47. A gas-fired burner unit for providing combustion and infrared radiation, the gas-fired burner unit comprising:
  a plenum for receiving a gas-air mixture;
  a downstream perforated metal plate mounted for receiving the gas-air mixture from the plenum and supplying the gas-air mixture to the combustion so that the combustion emanates outwardly from proximate a downstream side of the downstream perforated metal plate, wherein the downstream side of the downstream perforated metal plate is for emitting infrared radiation outwardly from the downstream perforated metal plate, and the downstream perforated metal plate is less than about 0.125 inches thick;
  an upstream perforated metal plate that is mounted in series with, and is positioned upstream from, the downstream perforated metal plate;
  a mounting plate, wherein
    the mounting plate is positioned between the downstream perforated metal plate and the upstream perforated metal plate so that the mounting plate is upstream of the downstream perforated metal plate,
    the mounting plate has a circumferential wall that at least partially extends around and defines a hole that extends through the mounting plate,
    the hole in the mounting plate is wider than perforations of the upstream and downstream perforated metal plates,
    the hole of the mounting plate at least partially defines a substantially discrete chamber between the downstream perforated metal plate and the upstream perforated metal plate,
    a downstream end of the chamber is obstructed by and defined by the downstream perforated metal plate,
    an upstream end of the chamber is obstructed by and defined by the upstream perforated metal plate, and
    the chamber is in fluid communication with both a plurality of the perforations of the upstream perforated metal plate and a plurality of the perforations of the downstream perforated metal plate, so that
      the plurality of perforations of the downstream perforated metal plate are for receiving the gas-air mixture from the plenum by way of the chamber, and
      the chamber is for receiving the gas-air mixture from the plenum by way of the plurality of perforations of the upstream perforated metal plate;
  at least one venturi mounted for providing the gas and air to the plenum, wherein the burner unit is operative so that substantially all of the air required for completing the combustion is provided via the at least one venturi while the burner unit's firing rate exceeds about 350 BTUH/in² of the burner unit's emitting surface; and
  an infrared energy emitter having opposite inner and outer sides, wherein the infrared energy emitter is mounted adjacent to the downstream perforated metal plate so that the inner side of the infrared energy emitter is spaced apart from and in opposing face-to-face relation with the downstream side of the downstream perforated metal plate for absorbing infrared radiation emitted from the downstream side of the downstream perforated metal plate, and the outer side of the infrared energy emitter is for emitting infrared radiation outwardly from the burner unit in response to the inner side of the infrared energy emitter absorbing infrared radiation emitted from the downstream side of the downstream perforated metal plate.

48. The gas-fired burner unit according to claim 47 in combination with a support for supporting food to be cooked, wherein the infrared energy emitter is positioned between the burner unit and the support, for emitting infrared radiation toward the support.

49. The gas-fired burner unit according to claim 47, wherein the infrared energy emitter is within about an inch from the downstream side of the downstream perforated metal plate.

50. The gas-fired burner unit according to claim 47, wherein the infrared energy emitter is solid.

51. The gas-fired burner unit according to claim 47, wherein the downstream perforated metal plate has a thickness within a range of about 0.0156 inches to about 0.0625 inches.

52. The gas-fired burner unit according to claim 47, wherein perforations of the downstream perforated metal plate are placed on straight centers within a range of about 0.040 inches to about 0.080 inches.

53. The gas-fired burner unit according to claim 47, wherein the burner unit is operative so that 100% of the air required for completing the combustion is provided via the at least one venturi while the burner unit's firing rate exceeds about 350 BTUH/in² of the burner unit's emitting surface.

54. The gas-fired burner unit according to claim 47, wherein velocity of the gas-air mixture through the perforations of the downstream perforated metal plate is no more than about 80% of the combustion's flame speed.

55. The gas-fired burner unit according to claim 47, wherein the mounting plate is thicker than each of the upstream and downstream perforated metal plates.

56. The gas-fired burner unit according to claim 47, wherein the downstream perforated metal plate and the upstream perforated metal plate are spaced apart by less than about 0.250 inches at the chamber.

57. The gas-fired burner unit according to claim 56, wherein the downstream perforated metal plate and the upstream perforated metal plate are spaced apart by at least about 0.050 inches at the chamber.

58. The gas-fired burner unit according to claim 56, wherein the downstream perforated metal plate and the upstream perforated metal plate are spaced apart by about 0.0625 inches at the chamber.

59. The gas-fired burner unit according to claim 47, wherein:
  the hole of the mounting plate is one of a plurality of holes that extend through the mounting plate,
  the downstream perforated metal plate is one of a plurality of downstream perforated metal plates that are adjacent to the mounting plate,
  groups of perforations of the downstream perforated metal plates are respectively aligned with, and respectively in communication with, the holes of the mounting plate,
  the upstream perforated metal plate is one of a plurality of upstream perforated metal plates that are adjacent to the mounting plate, and groups of perforations of the upstream perforated metal plates are respectively aligned with, and respectively in communication with, the holes of the mounting plate.

60. The gas-fired burner unit according to claim 59, wherein:
the mounting plate is a first mounting plate;
the downstream perforated metal plate is sandwiched between the first mounting plate and a second mounting plate;
the holes of the first mounting plate are respectively at least generally aligned with, and in fluid communication with, holes of the second mounting plate,
perforations of the downstream perforated metal plate have smaller widths than the holes that extend through the first and second mounting plates, and
perforations of the downstream perforated metal plate are respectively between, and in communication with, at least some of the holes of the first and second mounting plates.

61. The gas-fired burner unit according to claim 60, wherein:
a surface of the first mounting plate is in opposing face-to-face contact with a downstream side of the downstream perforated metal plate, and
a surface of the second mounting plate is in opposing face-to-face contact with an upstream side of the downstream perforated metal plate.

62. The gas-fired burner unit according to claim 47, wherein:
the downstream perforated metal plate is one of a plurality of downstream perforated metal plates,
the upstream perforated metal plate is one of a plurality of upstream perforated metal plates that are respectively mounted in series with, and are positioned upstream from, the downstream perforated metal plates;
the hole of the mounting plate is one of a plurality of holes of the mounting plate,
the plurality of holes of the mounting plate at least partially define a plurality of chambers that are positioned between the downstream perforated metal plates and the upstream perforated metal plates,
each of the chambers has a larger width than the perforations of the upstream and downstream perforated metal plates,
upstream ends of perforations of the downstream perforated metal plates are respectively open to the chambers, and
downstream ends of perforations of the upstream perforated metal plates are respectively open to the chambers.

63. The gas-fired burner unit according to claim 62, wherein the chambers are substantially discrete with respect to one another.

64. The gas-fired burner unit according to claim 62, wherein downstream surfaces of the upstream perforated metal plates are respectively in opposing face-to-face relation with upstream surfaces of the downstream perforated metal plates, so that the downstream surfaces and the upstream surfaces respectively cooperate to at least partially define the chambers.

65. The gas-fired burner unit according to claim 47, wherein perforations of the downstream perforated metal plate have a width in a range of about 0.025 inches to about 0.062 inches.

66. The gas-fired burner unit according to claim 65, wherein the width is in a range of about 0.030 inches to about 0.060 inches.

* * * * *